US006505204B1

United States Patent
Fanjoy

(10) Patent No.: US 6,505,204 B1
(45) Date of Patent: Jan. 7, 2003

(54) ENGINEERING SERVICES COORDINATING SYSTEM AND METHOD THEREFOR

(75) Inventor: Logan M. Fanjoy, Mesa, AZ (US)

(73) Assignee: Internet Design Engineering Automation Center, Inc., Scottsdale, AZ (US)

(*) Notice: Subject to any disclaimer, the term of this patent is extended or adjusted under 35 U.S.C. 154(b) by 0 days.

(21) Appl. No.: 09/283,835

(22) Filed: Mar. 31, 1999

(51) Int. Cl.[7] ........................ G06F 17/00; G06F 15/163; G06F 12/00
(52) U.S. Cl. ........................ 707/100; 707/102; 707/103; 707/203; 717/1; 709/332
(58) Field of Search ........................ 707/1–6, 8, 10, 707/100–104, 200–203, 501; 717/1–4, 11; 709/104, 106, 310–320, 329, 331, 332

(56) References Cited

U.S. PATENT DOCUMENTS 5,646,862 A * 7/1997 Jolliffe et al. .................. 703/1
5,724,508 A * 3/1998 Harple, Jr. et al. ......... 709/205

* cited by examiner

Primary Examiner—Hosain T. Alam
Assistant Examiner—Alford W. Kindred
(74) Attorney, Agent, or Firm—Lowell W. Gresham; Jordan M. Meschkow; Meschkow & Gresham, PLC

(57) ABSTRACT

A system (100) for coordinating engineering services (102) is provided. The system (100) uses a hyperdatabase (108) to encompass a CAE application library (122) for each CAE application program (120) used to provide the engineering services (102). Within the hyperdatabase (108), a program database (140) is configured for each CAE application library (122) to be encompassed. Each program database (140) has a plurality of datasets (142), each associated with a single CAE application record (134) in the CAE application library (122) and instantiating a one of a plurality of components (136). A data input routine (112) loads each dataset (142) with an identifier (150) uniquely identifying that dataset (142), query data (152) comprising attributes (148) of the instantiated component (136), graphic data (154) in a standardized format, and instantiation data (156) being the original CAE application record (134). A data extraction routine (116) extracts CAE product libraries (128) from the hyperdatabase (108). CAE product libraries (128) instantiate all the components (136) required of a single product (126), and allows coordination between all CAE application programs (120) used to engineer that product (126).

35 Claims, 12 Drawing Sheets

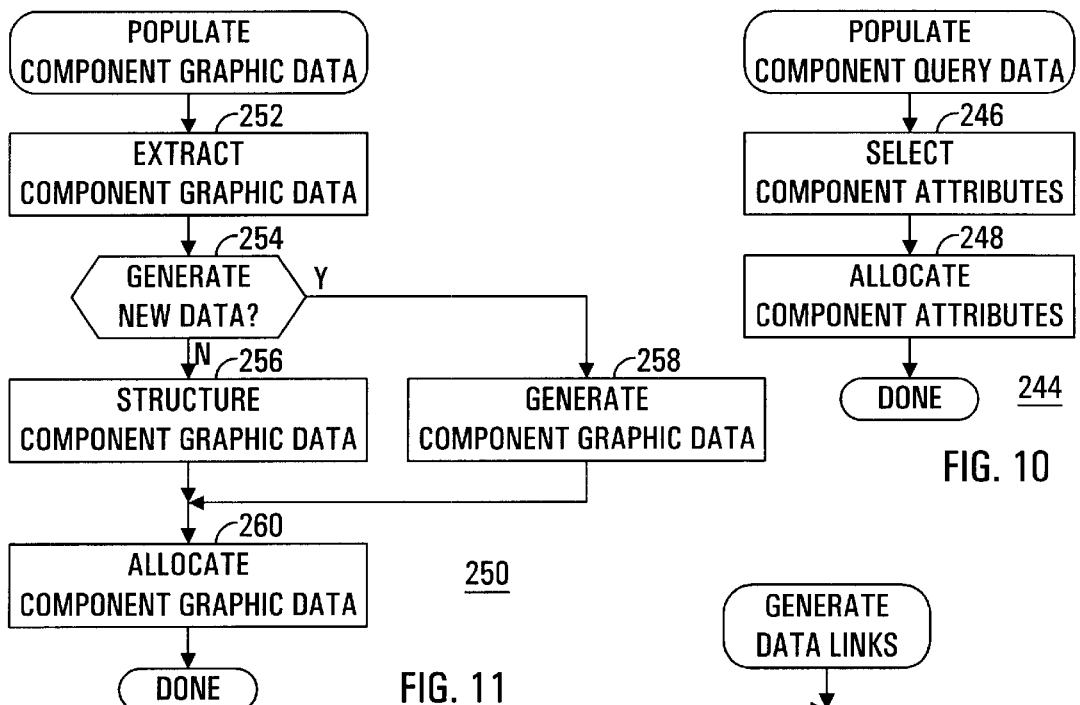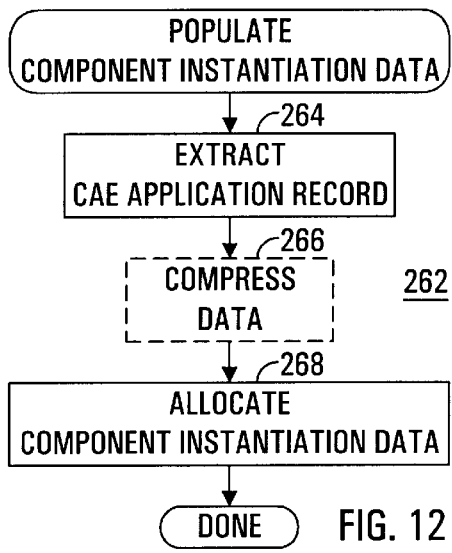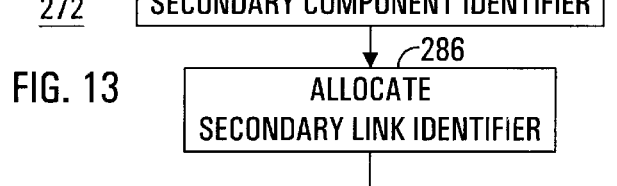
FIG. 10
FIG. 11
FIG. 12
FIG. 13

ENGINEERING SERVICES COORDINATING SYSTEM AND METHOD THEREFOR

TECHNICAL FIELD OF THE INVENTION

The present invention relates to the field of computer-aided engineering. More specifically, the present invention relates to a system for controlling libraries for diverse computer-aided engineering applications.

BACKGROUND OF THE INVENTION

Product development is greatly facilitated by the use of computer-aided engineering (CAE). For a given product, many separate CAE applications may facilitate passage from the original concept to the finished item. For example, to produce an electronic circuit board, CAE applications may be used to facilitate the original concept implementation (circuit design), the operational performance (simulation), the power consumption (power analysis), the power dissipation (thermal analysis), the logical layout (schematic development), the physical layout (routing), and the circuit board production (numerical control drilling, parts stuffing, etc.). Typical CAE applications in the computer and electronics industries are tabulated in Table 1 below.

TABLE 1

| Company | Tool Name | Tool Type |
| --- | --- | --- |
| Accel Technologies, Inc. | P-CAD | PCB Design |
| Accel Technologies, Inc. | TANGO | Schematic Capture |
| Adv. Cam Tech., Inc. | CAM350 | CAM |
| Adv. Interconnection Tech. | AIT | PCB Design |
| ADI, Inc. | Pro Circuit Builder | CAM |
| Cadence Design Systems | Allegro | PCB Design |
| Cadence Design Systems | HDL | Schematic Capture |
| Dansk Data Electronik | Supermax E-CAD | PCB Design |
| HyperLynx | HyperLynx | CAM |
| INCASES, Inc. | THEDA | PCB Design |
| INCASES, Inc. | EMC-WORKBENCH | Simulation |
| Innovatic CAD Software | CAMtastic | CAM |
| Interactive Image Tech. | Elec. Workbench | PCB Design |
| Intercept Tech., Inc. | Pantheon | PCB Design |
| Lavenier Tech., Inc. | Lavenier | CAM |
| Mentor Graphics | Board Station | PCB Design |
| Mentor Graphics | Design Architect | Schematic Capture |
| OrCAD | Capture | Schematic Capture |
| OrCAD | Layout Plus | PCB Design |
| PADS Software | PADS-PowerPCB | PCB Design |
| Premier EDA Software | actiVplace | PCB Design |
| Protel | Advance Schematic | Schematic Capture |
| Protel | Advanced PCB | PCB Design |
| VeriBest, Inc. | Destination PCB | PCB Design |
| VeriBest, Inc. | Design Capture | Schematic Capture |
| Viewlogic Systems, Inc. | ViewDraw | Schematic Capture |
| Viewlogic Systems, Inc. | Fusion/VCS | Simulation |
| Wise Sofiware, Inc. | GerberTool | CAM |
| Zuken-Redac | System Designer | Schematic Capture |
| Zuken-Redac | CADSTAR | PCB Design |

While the example and Table 1 demonstrated hereinabove refer to the computer and electronics industries, those skilled in the art will appreciate that other industries, e.g., automotive, architectural/construction, etc., have their own CAE applications and requirements.

Each CAE application includes primarily an application program and a library containing the requisite data. Because of the proliferation of CAE applications and their suppliers, there is no standard format for these CAE data libraries. In effect, every application utilizes a data library in a proprietary or "native" format.

A problem exists because of this proliferation of library formats. It is difficult for organizations using multiple CAE applications to manage their libraries. Indeed, in terms of investment and man-hours, engineering companies often expend as much upon library creation and management as they do on actual design. This is a highly inefficient use of resources.

Another problem exists because of this proliferation of library formats, since a typical CAE application library is dedicated solely to a specific CAE application program, i.e., contains data in a format native to that application program, the coordination of components across multiple applications for the engineering of a specific product is difficult, time-consuming, and costly.

Also, a typical CAE application library instantiates all the components recognizable by that application. For a given product, only a subset of these components are required to be instantiated. A problem exists, therefore, in that the CAE application uses its entire library in the engineering of each and every product, without regard to the components actually required of that product. Because of this, the application spends an undesirably long amount of time searching the entire library for each component of the product. Since a library may instantiate tens of thousands of components, this search time may pose a significant problem to the engineer.

A typical CAE application library is not expandable, short of replacement. That is, all associations and links within the library are fixed, and each instantiated component is limited to those links. This poses a problem whenever a need arises to link a given component in a different manner.

Additionally, the direct use of CAE applications are only some of the engineering services utilized in product design. Ancillary services, such as shipping and receiving, inventory control, document management, cost management, billing, etc., also require data to perform efficiently. At present, there is no economical or efficient manner in which these business-level engineering services may garner this data from the CAE application libraries or engineering services can take advantage of business data.

Many theoretical schemata have been developed to circumvent or correct the above and other CAE problems. Unfortunately, many such schemata require the use of data not available when needed. This data may, for example, be the physical shape of a component. If the engineer is at that time using a logical design CAE application, shape data is simply not available. Other schemata, recognizing that various CAE applications each use a subset of the characteristics or attributes of a given component, require that humans unerringly perform some bookkeeping task to provide cross-application information. Such a schema requires that the people involved create and maintain a "hard-copy" database for each product, where any error or omission may effectively nullify the entire database. Using conventional techniques, excessive costs are involved in ensuring the requisite accuracy.

What is needed, therefore, is a practical method of managing the libraries of a large number of CAE applications in a simple an coordinated manner. Such a method would significantly increase the efficiency and lower the cost of library management and associated engineering services.

What is also needed is a practical method of cross-referencing and organizing multiple CAE application libraries to permit the extraction of data on any given component from any library or combination of libraries. This method should be easily maintainable, be accessible by any person in the entirety of the product engineering process, and facilitate the operation of each individual engineering service.

What is also needed is a practical method of extracting from a "parent" CAE application library, which may instantiate tens of thousands of components, a product-specific CAE application library limited to instantiating only those components utilized by the specific product. In this manner, much extraneous data and searching time is eliminated, significantly improving the efficiency of the CAE applications involved.

What is also needed is a practical method of cross-linking the data in each CAE application library to the data in all other libraries. This should be accomplished without interfering with the format or the integrity of any library.

What is also needed is a practical method of expanding data on any given component. This expanded data should be linkable in a manner different than the parent data, but should not interfere with or compromise the integrity of the original data.

What is also needed is a practical method of extracting data from any combination of CAE application libraries for use by a wide variety of engineering services. This would allow these services to be performed in an efficient and cost-effective manner.

What is needed is a practical system capable of fulfilling the above needed methods in any of a combination of manners usable by the engineers and others involved in the engineering of a product.

SUMMARY OF THE INVENTION

Accordingly, it is an advantage of the present invention that an engineering services coordinating system and method therefor is provided.

It is another advantage of the present invention that a hyperdatabase is provided that manages a large number of independent CAE application libraries.

It is another advantage of the present invention that a program database is provided in a hyperdatabase for each CAE application program wherein each program database encompasses a CAE application library associated with that CAE application program.

It is another advantage of the present invention that a data extraction routine is provided that extracts from a program database associated with a given CAE application program a CAE product library comprising a product-specific subset of a CAE application library for that CAE application program.

It is another advantage of the present invention that a link table is provided that cross-links components instantiated by one CAE application library with like components instantiated by other CAE application libraries.

It is another advantage of the present invention that a method is provided to expand a CAE application library associated with a given CAE application program without altering the integrity of that library.

It is another advantage of the present invention that a method is provided for the extraction of data from any combination of CAE application libraries.

It is another advantage of the present invention that efficient engineering results from reliance upon a hyperdatabase that manages a large number of independent CAE application libraries.

The above and other advantages of the present invention are carried out in one form by a method for coordinating engineering services. These services are provided using a plurality of computer-aided engineering (CAE) application programs, each of which programs has one of a plurality of CAE application libraries, each of which libraries contains a plurality of CAE application records, and each of which records instantiates one of a plurality of components. The method creates a hyperdatabase. The method also constructs, within the hyperdatabase, a link table having a plurality of link records. The method also generates, within the hyperdatabase, a program database associated with one of the CAE application programs. The method also populates the program database with a plurality of component datasets, wherein each of the component datasets instantiates one of the components. The method also generates, within the link table, a link between one of the component datasets instantiating one of the components in one of the program databases and others of the component datasets instantiating the one component in another of the program databases. The method also repeats the database-generating, the database-populating, and the link-generating operations for others of the CAE application libraries. The method also engineers a product utilizing data contained in selected ones of the component datasets, the product-engineering operation being coordinated through the links in the hyperdatabase.

The above and other advantages of the present invention are carried out in another form by a system for coordinating engineering services provided using a plurality of computer-aided engineering (CAE) application programs, each of which programs has one of a plurality of CAE application libraries, each of which libraries contains a plurality of CAE application records, and each which records instantiates one of a plurality of components. The system comprises three segments of a computer-readable medium, wherein the first segment is configured as a hyperdatabase, the second segment is configured as a data input routine for incorporating the CAE application libraries into the hyperdatabase, and the third segment is configured as a data extraction routine that extracts CAE product libraries from the hyperdatabase, wherein each CAE product library is configured for use with one CAE application program. The system also comprises an engineering instrument, responsive to one CAE product library, for engineering a product.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 10 depicts a flowchart demonstrating a hypertask for populating a component dataset with component query data in accordance with a preferred embodiment of the present invention;

FIG. 11 depicts a flowchart demonstrating a hypertask for populating a component dataset with component graphic data in accordance with a preferred embodiment of the present invention;

FIG. 12 depicts a flowchart demonstrating a hypertask for populating a component dataset with component instantiation data in accordance with a preferred embodiment of the present invention;

FIG. 13 depicts a flowchart demonstrating a hypertask for generating component dataset data links in accordance with a preferred embodiment of the present invention;

GLOSSARY

For purposes of clarity, the following terms have the following definitions herein:

engineering service: any service used in the design, implementation, or construction of a product;

engineering instrument: any device, construct, or program to facilitate the implementation of an engineering service;

CAE application program: a commercially-available or proprietary (internal) CAE program configured to facilitate an engineering service;

CAE application library: a database configured for use with a CAE application program and instantiating a broad set of components;

CAE product library: a database configured for use with a CAE application program and instantiating a set of components sufficient for a given product;

CAE application record: a record within a CAE application or product library instantiating a single component;

CAE application format: a CAE application record data format native to a given CAE application program;

CAE component attribute: any of a plurality of defining attributes for a given component;

hyperdatabase: a database of databases configured to incorporate a plurality of CAE application libraries;

program database: a database within the hyperdatabase configured to incorporate a single CAE application library for a single CAE application program;

component dataset: a record of records, within a program database, instantiating a single component;

component identifier: data uniquely identifying a given component dataset;

component query data: data containing a selected set of component attributes for the component instantiated by the component dataset;

component graphic data: data configured to produce a graphic image of the component instantiated by the component dataset;

component instantiation data: a CAE application record extracted from the parent CAE application program and instantiating a given component;

link table: a database within the hyperdatabase configured to associate component datasets in one program database with component datasets in other program databases;

link record: link table data establishing a link between a given component dataset and another component dataset;

primary link identifier: data within a link record identifying a component dataset which links are to be established; and secondary link identifier: data within a link record identifying the component dataset linked to the component dataset identified by the primary link identifier.

DETAILED DESCRIPTION OF THE PREFERRED EMBODIMENTS

For purposes of clarity, reference numbers for structures are in the 100's and reference numbers for processes and tasks are in the 200's and 300's. Throughout this discussion and in all figures, like items have like reference numbers.

Figure 1:
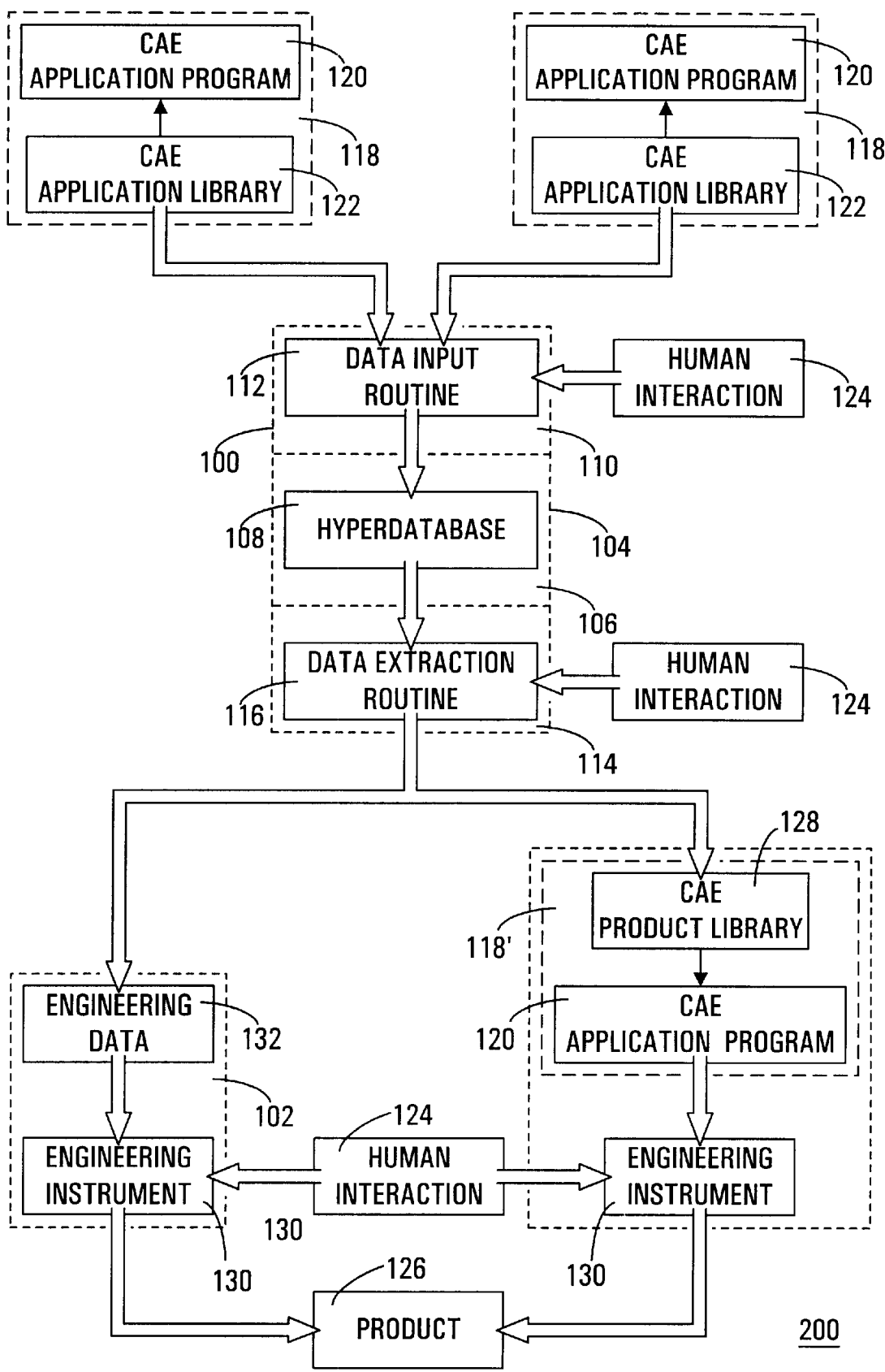
FIG. 1 depicts a flowchart demonstrating a method for coordinating engineering services in accordance with a preferred embodiment of the present invention.

FIG. 1 depicts a flowchart demonstrating a process 200 for using an engineering services coordinating system 100 to receive, contain, manage, and coordinate data for a plurality of engineering services 102 in accordance with a preferred embodiment of the present invention.

System 100 is made up of a computer-readable medium 104 in three segments. A first segment 106 is configured as a hyperdatabase 108, a second segment 110 is configured (programmed) as a data input routine 112, and a third segment 114 is configured (programmed) as a data extraction routine 116.

One form of engineering services 102 encompasses the use of a computer-aided engineering (CAE) application 118. CAE application 118 comprises a CAE application program 120 configured to perform any one of a multiplicity of specific tasks, i.e., circuit design, circuit analysis and simulation, schematic layout, printed-circuit board layout, etc., and a CAE application library 122 containing the data utilized by that one specific task.

FIG. 1 depicts multiple CAE applications 118. It is a significant advantage of the present invention that multiple CAE application libraries 122, from multiple CAE applications 118, are stored in hyperdatabase 108. Hyperdatabase 108 then allows data in one CAE application library 122 to be linked to data in other CAE application libraries 122, even when the linked CAE application libraries 122 are mutually incompatible. This linking, discussed in greater detail hereinbelow, is not feasible with independent CAE application libraries 122.

To store data in hyperdatabase 108, data input routine 112 inputs each CAE application library 122 into hyperdatabase 108 via human interaction 124, i.e., under the control of a human operator.

To engineer a specific product 126, data extraction routine 116 extracts a CAE product library 128 from hyperdatabase 108 via human interaction 124. CAE product library 128 is configured to work with a specific CAE application program 120 whose original CAE application library 122 has previously been input into hyperdatabase 108. CAE product library 128 desirably contains a subset of the data of the original CAE application library 122 sufficient to effect a product-specific CAE application 118' for product 126. By limiting the data contained in CAE product library 128, the efficiency of product-specific CAE application 118' is significantly improved over original CAE application 118.

Product-specific CAE application 118', in conjunction with an engineering instrument 130, form engineering service 102. Engineering instrument 130 represents any device or combination of devices required to fulfill the function of product-specific CAE application 118', i.e., computers, printers, plotters, assembly tools, laboratory equipment, etc.

Alternatively, data extraction routine 116 may extract engineering data 132 from hyperdatabase 108 via human interaction 124. Engineering data 132 represents any data or combination of data, such as a component pick list, not configured as CAE product library 128. Engineering data 132, in conjunction with engineering instrument 130, allow engineering service 102 to be performed. Engineering instrument 130 is used with engineering data 132 to fulfill an engineering service 102 not associated with product-specific CAE application 118'.

Engineering service 102 is any service rendered in the production of product 126. Engineering services 102 are diverse, and ranges from the most sophisticated to the most mundane, e.g., from logical design to document filing.

Figure 2:
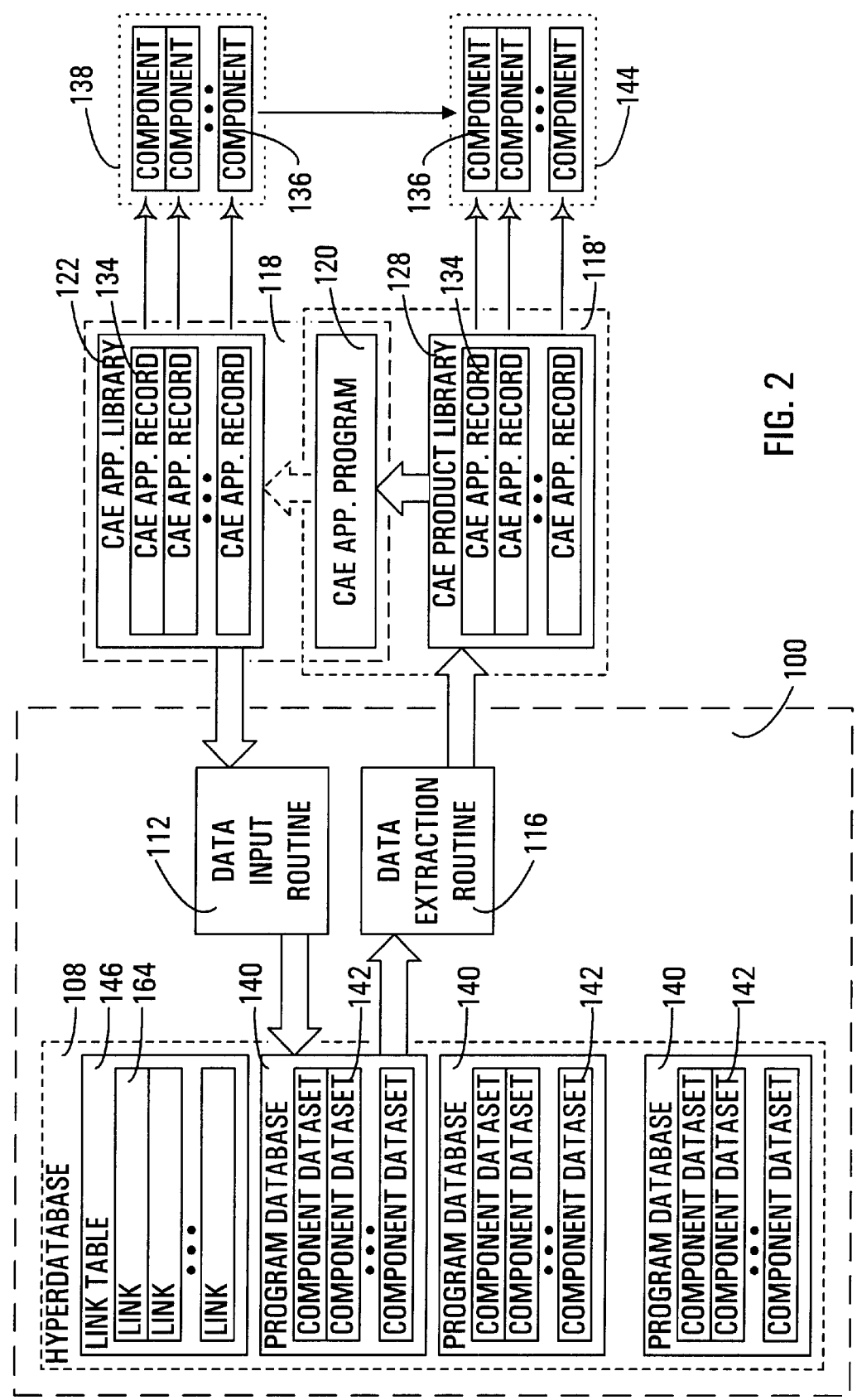
FIG. 2 depicts a block diagram demonstrating the operation of a simplified engineering services coordinating method functioning with a single computer-aided engineering application program in accordance with a preferred embodiment of the present invention.

FIG. 2 depicts a block diagram demonstrating the operation of a simplified engineering services coordinating process 200 functioning with a single CAE application program 120 in accordance with a preferred embodiment of the present invention. The following discussion refers to FIGS. 1 and 2.

Original CAE application 118 comprises CAE application program 120 and CAE application library 122. CAE application library 122 contains the data for all functions of original CAE application 118. That is, CAE application library 122 contains a plurality of CAE application records 134, each of which instantiates one component 136 for original CAE application 118.

The number of components 136 instantiated by CAE application library 122 represents all the components 136 recognized by original CAE application 118. This number of components 136 may be quite large, in the tens or hundreds of thousands or more, and represents an application plurality 138 of components 136. Since each component 136 is instantiated by one CAE application record 134, there is a like quantity of CAE application records 134 in CAE application library 122.

Data input routine 112 inputs the entirety of CAE application library 122 into hyperdatabase 108. To do this, data input routine 112 creates a program database 140 within hyperdatabase 108 to receive the data. For each CAE application record 134 in CAE application library 122, data input routine 112 creates a component dataset 142 within program database 140 and populates component dataset 142 with data from CAE application record 134.

As a result, program database 140 in hyperdatabase 108 desirably contains the entirety of CAE application library 122. That is, program database 140 contains one component dataset 142 for each CAE application record 134 in CAE application library 122. Each component dataset 142 instantiates one component 136, with desirably the entirety of application plurality 138 of components 136 being instantiated.

CAE application library 122 is therefore rendered superfluous and desirably is disassociated from CAE application program 120. That is, CAE application library 122 is desirably removed from original CAE application 118, thus is not available to CAE application program 120.

FIG. 2 depicts hyperdatabase 108 with multiple discrete program databases 140. Those skilled in the art will appreciate that program databases 140 may be contiguous, rather than discrete, and that the manner in which program databases 140 and other elements are contained within hyperdatabase 108 is irrelevant to the intent of the present invention and the scope of the appended claims.

In order to use CAE application program 120 to engineer product 126, a CAE library of some type is used. Data extraction routine 116 determines which components 136 are instantiated by program database 140, i.e., which components 136 of application plurality 138 of components 136, are required of product 126. These requisite components 136 make up a product plurality 144 of components 136. Product plurality 144 is less than or equal to application plurality 138.

Data extraction routine 116 creates CAE product library 128 to contain the requisite data. Data extraction routine 116 extracts the data from component datasets 142 in program database 140 and populates CAE application records 134 in CAE product library 128. CAE product library 128 contains a reduced set of CAE application records 134 suitable for product 126. That is, CAE product library 128 contains one CAE application record 134 for each component 136 in product plurality 144 of components 136.

CAE product library 128 and original CAE application program 120 make up product-specific CAE application 118'. Product-specific CAE application 118' functions identically to original CAE application 118, save that, because of the reduced number of CAE application records 134 in CAE product library 128, there is a significant increase in performance and efficiency in the use of CAE application program 120.

Figure 3:
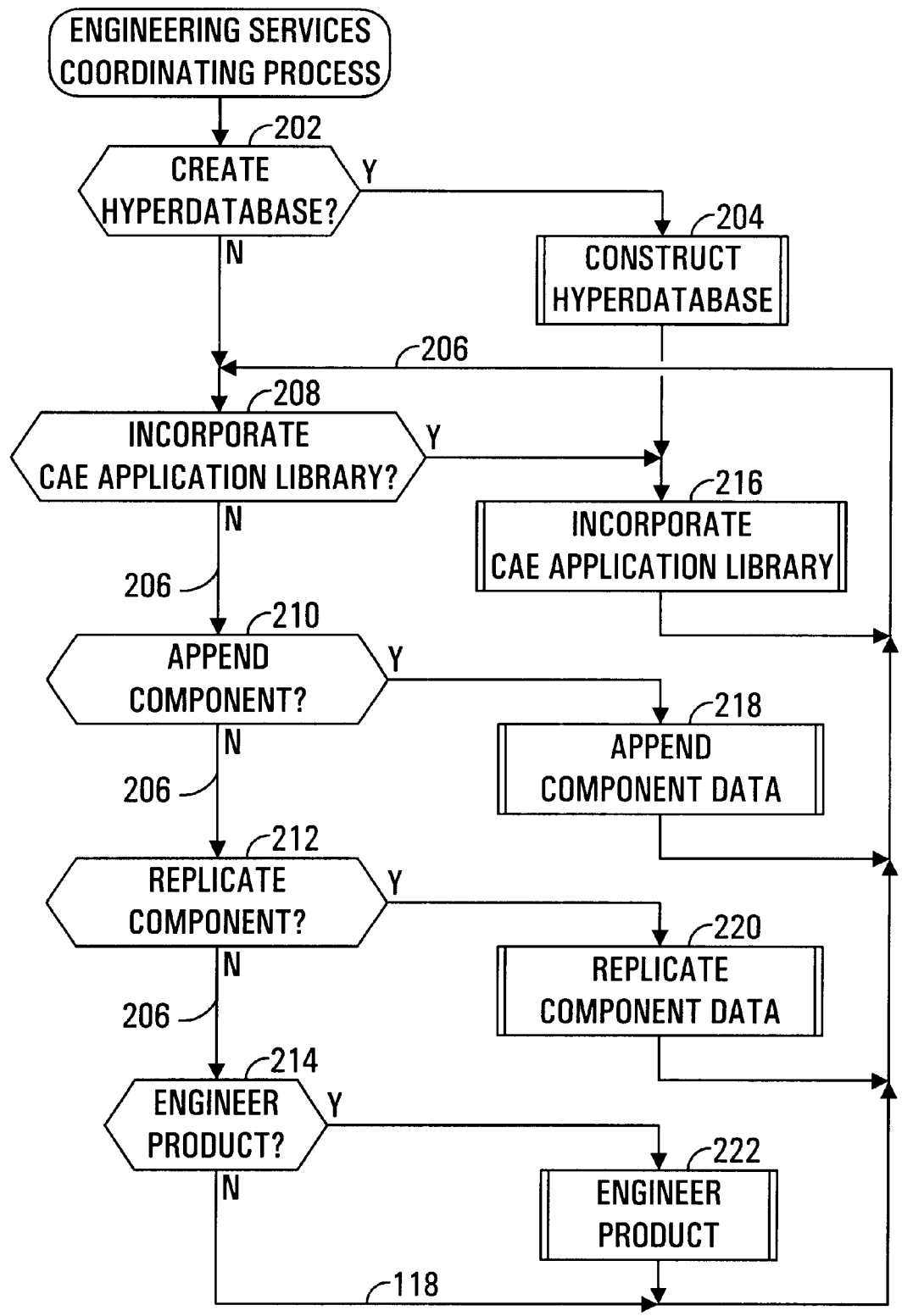
FIG. 3 depicts a flowchart demonstrating an engineering services coordinating process in accordance with a preferred embodiment of the present invention.

FIG. 3 depicts a flowchart demonstrating engineering services coordinating process 200 in accordance with a preferred embodiment of the present invention. The following discussion refers to FIGS. 2 and 3.

In the preferred embodiment, process 200 consists primarily of initialization and maintenance. In initialization, executed only during start up of engineering services coordinating system 100, a query task 202 determines if hyperdatabase 108 has been created. If task 202 determines that hyperdatabase 108 has not been created, then a subprocess 204 constructs hyperdatabase 108 (discussed in more detail hereinbelow). If task 202 determines that hyperdatabase 108 has been created and does contain data, then initialization is complete and control enters an intra-process monitoring loop 206, comprising iterative cycling among query tasks 208, 210, 212, and 214 (discussed hereinbelow).

In loop 206, query task 208 determines if a CAE application library 122 is to be incorporated into hyperdatabase 108. If task 208 determines that a CAE application library 122 is to be incorporated, then a subprocess 216 performs the incorporation (discussed in more detail hereinbelow). After subprocess 216, control loops back to task 208.

If task 208 determines that no CAE application library 122 is to be incorporated in hyperdatabase 108, then task 210 determines if data for another component 136 is to be appended to an existing program database 140 within hyperdatabase 108. If task 210 determines that component data is to be appended, then a subprocess 218 appends the component data (discussed in more detail hereinbelow). After subprocess 218, control loops back to task 208.

If task 210 determines that no component data is to be appended, then task 212 ascertains if existing data for a given component 136 is to be replicated in an existing program database 140 within hyperdatabase 108. If task 212 determines that existing component data is to be replicated, then a subprocess 220 replicates the component data (discussed in more detail hereinbelow). After subprocess 220, control loops back to task 208.

If task 212 determines that no existing component data is to be replicated, then task 214 determines if product 126 (FIG. 1) is to be engineered. If task 214 determines that product 126 is to be engineered, then a subprocess 222 engineers product 126 (discussed in more detail hereinbelow). After subprocess 222, control loops back to task 208.

If task 214 determines that no product 126 is to be engineered, control loops back to task 208.

Figure 4:
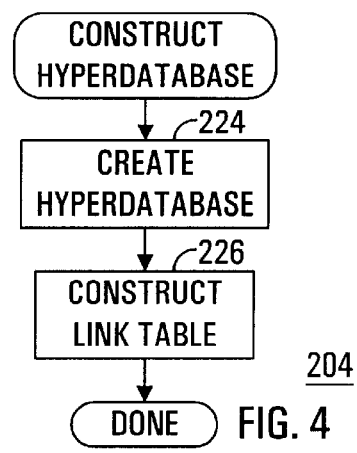
FIG. 4 depicts a flowchart demonstrating a hyperdatabase construction subprocess in accordance with a preferred embodiment of the present invention.

FIG. 4 depicts a flowchart demonstrating hyperdatabase-constructing subprocess 204 (FIG. 3) in accordance with a preferred embodiment of the present invention. The following discussion refers to FIGS. 2 and 4.

When task 202 (FIG. 3) determines that hyperdatabase 108 has not been created, process 200 executes subprocess 204. Within subprocess 204, a task 224 creates hyperdatabase 108. Hyperdatabase 108 is created on an appropriate computer-readable medium 104 having sufficient free space for such a large database, such as a magnetic, optical, or magneto-optical drive.

Following task 224, a task 226 constructs a link table 146 within hyperdatabase 108. Link table 146 is a database structured to contain link pointers for component datasets 142 which will be created and populated within hyperdatabase 108.

Following task 226, or when task 208 (FIG. 3) determines that a CAE application library 122 is to be incorporated, process 200 executes subprocess 216.

Figure 5:
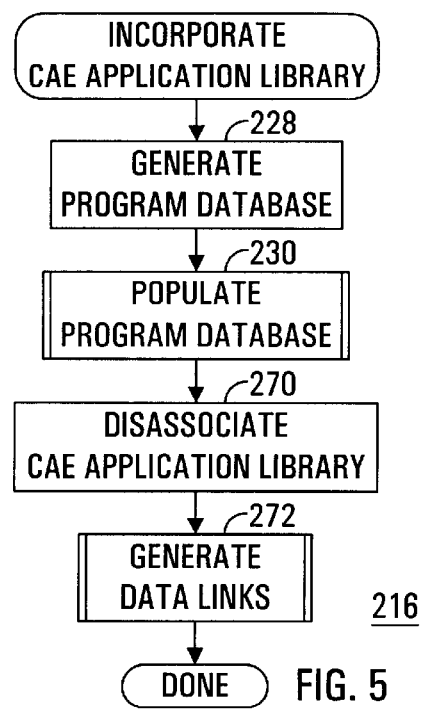
FIG. 5 depicts a flowchart demonstrating a CAE application library incorporation subprocess in accordance with a preferred embodiment of the present invention.

FIG. 5 depicts a flowchart demonstrating library-incorporating subprocess 216 in accordance with a preferred embodiment of the present invention. The following discussion refers to FIGS. 2, 4, and 5.

Within subprocess 216, a task 228 generates program database 140 within hyperdatabase 108. Program database 140 is configured to incorporate a specific CAE application library 122 and, once populated, to be associated with the specific CAE application program 120 formerly associated with that specific CAE application library 122.

Figure 6:
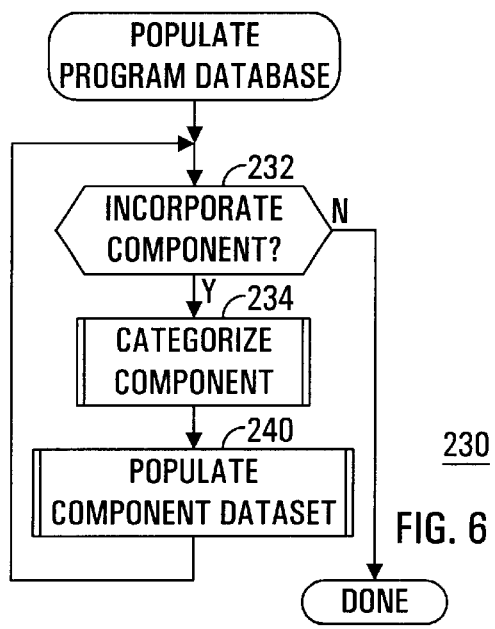
FIG. 6 depicts a flowchart demonstrating a program database population hypertask in accordance with a preferred embodiment of the present invention.

Following task 228, a hypertask (i.e., a task containing other tasks) 230 populates program database 140. FIG. 6 depicts a flowchart demonstrating hypertask 230 in accordance with a preferred embodiment of the present invention. The following discussion refers to FIGS. 2 and 6.

Figure 7:
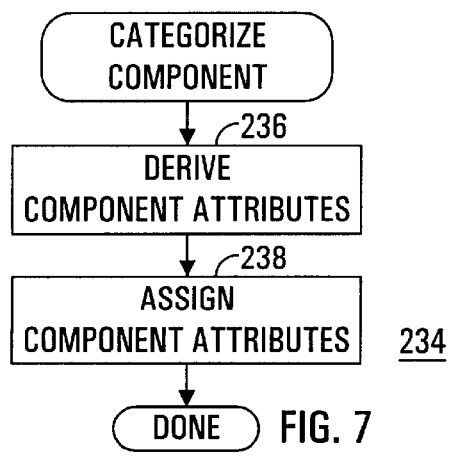
FIG. 7 depicts a flowchart demonstrating a hypertask for categorizing a component in accordance with a preferred embodiment of the present invention.
Figure 8:
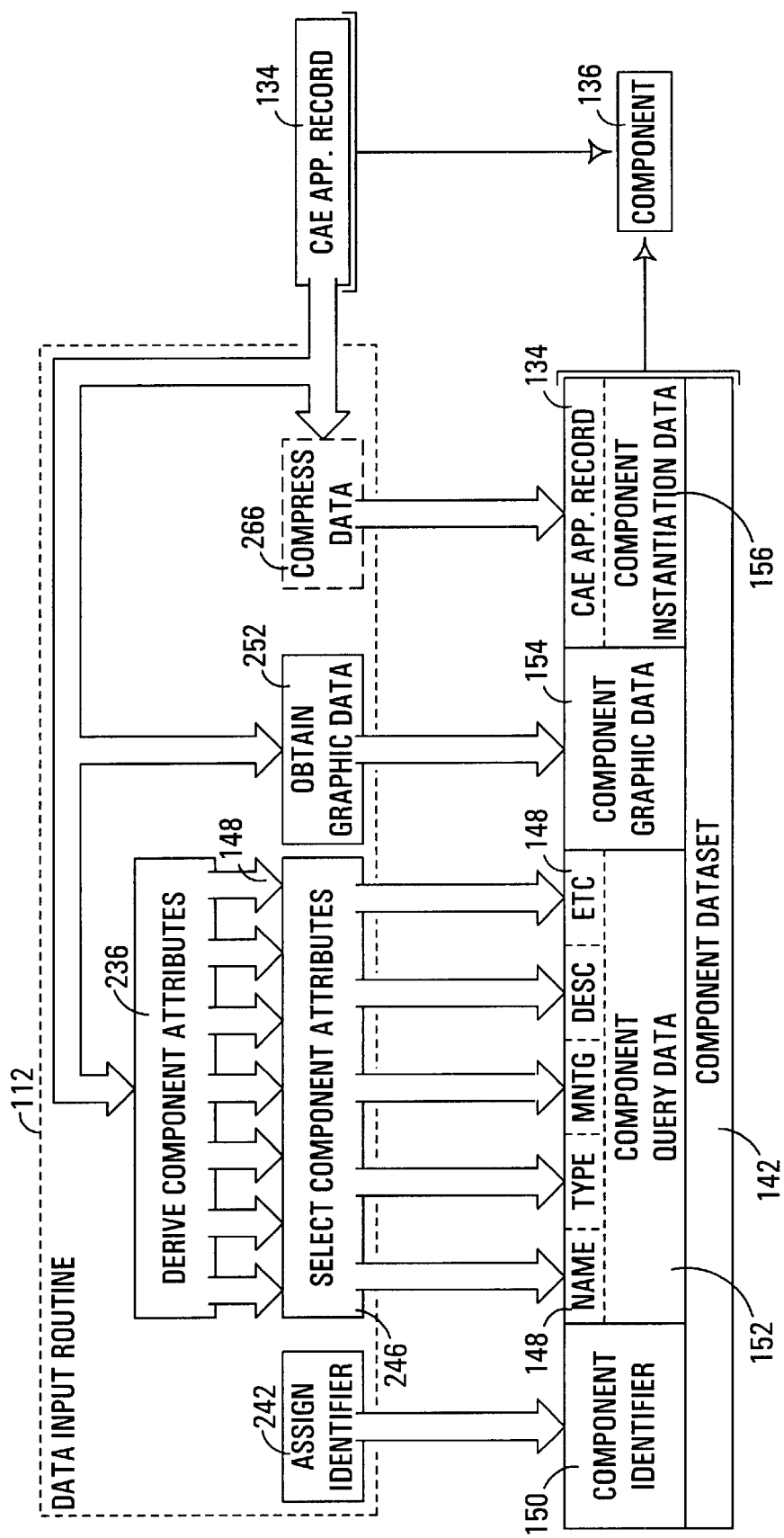
FIG. 8 depicts a block diagram demonstrating the loading of a component dataset via a data input routine in accordance with a preferred embodiment of the present invention.

Within hypertask 230, a query task 232 checks each CAE application library 122 for one CAE application record 134 that has not yet been incorporated into program database 140. That is, task 232 compares components 136 instantiated by program database 140 against components 136 instantiated by CAE application library 122. If task 232 determines that a component 136 is instantiated by CAE application library 122 and not by program database 140, then a hypertask 234 categorizes the component 136. FIG. 7 depicts a flowchart demonstrating hypertask 234, and FIG. 8 depicts a block diagram demonstrating the loading of component dataset 142 via data input routine 112, in accordance with a preferred embodiment of the present invention. The following discussion refers to FIGS. 2, 7, and 8.

Within hypertask 234, data input routine 112, through the help of human interaction 124 (FIG. 1), effects a task 236 to derive component attributes 148 from CAE application record 134 instantiating the subject component 136. Component attributes 148 are substantially labels, characteristics, or parameters categorizing component 136. For example, if component 136 were to be an Allen-Bradley, 47 kilohm, ¼ watt, metal film, axial lead resistor, then possible component attributes 148 might be: Name=Resistor; Value=47 kΩ; Power=¼ w; Type=Metal Film; Mtng=Axial; Mfgr=Allen-Bradley; etc. It may be readily seen from the above, that different components 136 will have different component attributes 148, and that not all component attributes 148 are relevant to a given component 136.

Following task 236, a task 238 assigns relevant component attributes 148 to component 136. Task 238 completes hypertask 234 (FIG. 7) and control returns to hypertask 230 (FIG. 6).

Figure 9:
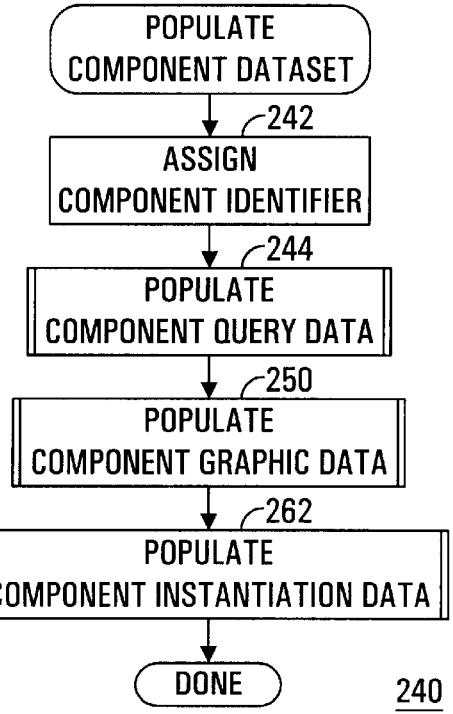
FIG. 9 depicts a flowchart demonstrating a hypertask for populating a component dataset in accordance with a preferred embodiment of the present invention.

A hypertask 240 then populates component dataset 142. FIG. 9 depicts a flowchart demonstrating hypertask 240 in accordance with a preferred embodiment of the present invention. The following discussion refers to FIGS. 2, 8, and 9.

Within hypertask 240, a task 242 assigns a component identifier 150 to component dataset 142. Component identifier 150 uniquely identifies component dataset 142 within the entirety of hyperdatabase 108.

Those skilled in the art will appreciate that component identifier 150 may be data stored within component dataset 142, or may be a location of component dataset 142 within hyperdatabase 108 (i.e., a relative address) or within computer-readable medium 104 (i.e., an absolute address). The use of any manner of obtaining and/or storing a unique component identifier 150 does not depart from the spirit of the present invention nor the scope of the appended claims.

In a hypertask 244, data input routine 112 then populates component dataset 142 with component query data 152. FIG. 10 depicts a flowchart demonstrating hypertask 244 in accordance with a preferred embodiment of the present invention. The following discussion refers to FIGS. 2, 8, and 10.

Within hypertask 244, a task 246 selects some of component attributes 148 assigned to component 136 by task 238 (FIG. 7). The specific component attributes 148 selected by task 246 may be determined through the help of human interaction 124 (FIG. 1) with data input routine 112.

In a task 248, the selected ones of component attributes 148 are allocated to component dataset 142 as component query data 152. These allocated component attributes 148, i.e., component query data 152, form a basis in program database 140 for selecting one component dataset 142 instantiating one component 136 over another component dataset 142 instantiating the same or another component 136.

Task 248 completes hypertask 244 (FIG. 10) and control returns to hypertask 240 (FIG. 9). In a hypertask 250, data input routine 112 then populates component dataset 142 with component graphic data 154. FIG. 11 depicts a flowchart demonstrating hypertask 250 in accordance with a preferred embodiment of the present invention. The following discussion refers to FIGS. 2, 8, and 11.

Within hypertask 250, a task 252 extracts component graphic data 154 from CAE application record 134. Component graphic data 154 within hyperdatabase 108 serves as a selection criteria for product engineering (discussed hereinbelow) and is typically used by process 200 with the help of human interaction 124.

Task 252 may fail, as not all CAE application records 134 contain graphic data. For example, if the CAE application program 120 has no need of graphic representation, then the associated CAE application library 122 may not contain component graphic data 154 for task 252 to extract.

Task 252 may successfully extract invalid component graphic data 154. For example, a given CAE application program 120 may contain an inherent set of graphic data, with the CAE application library 122 containing selection criteria for that data. Task 252 may successfully extract this selection criteria as graphic data. However, since this data is meaningless without the CAE application program 120, the extracted component graphic data 154 is invalid in terms of hyperdatabase 108.

Task 252 may successfully extract unsuitable component graphic data 154. A given CAE application library 122 may contain graphic data that is relevant only to the specific CAE application 118 for which it is intended. A numerical drilling program, for example, may contain cryptic marks indicating the sizes of the holes to be drilled. While task 252 may extract this as valid component graphic data 154, it would be unsuitable for the purposes of hyperdatabase 108.

A query task 254, therefore, then determines if new component graphic data 154 needs to be generated, i.e., that component graphic data 154 was successfully extracted, that it was valid, and that it was suitable. If task 254 determines that no new component graphic data 154 need be generated, then a task 256 structures component graphic data 154 into a predetermined graphic data format (not shown) by performing any needed conversions. By structuring component graphic data 154 into the predetermined graphic data format, all component graphic data 154 in hyperdatabase 108 may be accessed in a common manner.

If task 254 determines that new component graphic data 154 needs to be generated, i.e., that component graphic data 154 was not successfully extracted, that it was invalid, or that it was unsuitable, then data input routine 112 may, with human interaction 124 (FIG. 1), execute a task 258 to generate component graphic data 154 in the predetermined graphic data format. By generating component graphic data 154 where extraction fails, each component 136 is instantiated by component graphic data 154, which may then be used as selection criteria for that component 136.

Whether component graphic data 154 was successfully extracted by task 252 and structured by task 256, or was generated by task 258, a task 260 then allocates component graphic data 154 to component dataset 142.

In the preferred embodiment, the preferred graphic data format is a graphic metafile format. The use of a graphic metafile format allows for an efficient storage of a representative graphic. This in turn allows component graphic data 154 to be directly stored in component dataset 142. Those skilled in the art, however, will appreciate that any graphic data format may be used for the predetermined graphic data format. Similarly, those skilled in the art will appreciate that component dataset 142 may directly contain component graphic data 154, or component dataset 142 may contain a pointer to component graphic data 154 stored elsewhere within hyperdatabase 108. The use of direct or indirect storage departs from neither the spirit of the present invention nor the scope of the appended claims.

Task 260 completes hypertask 250 (FIG. 11) and control returns to hypertask 240 (FIG. 9). In a hypertask 262, data input routine 112 then populates component dataset 142 with component instantiation data 156. FIG. 12 depicts a flowchart demonstrating hypertask 262 in accordance with a preferred embodiment of the present invention. The following discussion refers to FIGS. 2, 8, and 12.

Within hypertask 262, a task 264 extracts CAE application record 134 from CAE application library 122. An optional task 266 may then compress CAE application record 134. A task 268 then allocates CAE application record 134, in its entirety, to component dataset 142 as component instantiation data 156. Component dataset 142 therefore encompasses CAE application record 134.

CAE application record 134 is contained in CAE application library 122 in a CAE application format (not shown) native to the specific CAE application 118. Thus the CAE application format is preserved. That is, CAE application record 134 is contained in component dataset 142 within program database 140 in exactly the same format (except for optional compression) it had within CAE application library 122.

Those skilled in the art will appreciate that the use of compression allows the storage of CAE application records 134 in a more efficient manner. In the preferred embodiment, CAE application records 134 are compressed and stored in component datasets 142. However, those skilled in the art will appreciate that CAE application records 134 may be stored elsewhere in hyperdatabase 108, with or without compression, with appropriate pointers stored in component datasets 142. The use of alternative storage and/or compression in no way departs from the spirit of the present invention nor the scope of the appended claims.

Those skilled in the art will also appreciate that, by storing CAE application record 134 in component dataset 142 in its original native format, the need for input and output translation is eliminated. Input and output translation would require the use of translators (i.e., translation routines) that would increase the costs and overhead of system 100, reduce storage and extraction efficiency, and introduce a significant potential for translation errors. Of these, translation error is the most pernicious. If an extracted CAE application record 134 in a CAE product library 128 is not identical to the corresponding CAE application record 134 in the original CAE application library 122, CAE application program 120 would not produce the proper results and an engineering service 102 utilizing that CAE application 118' would most likely fail.

CAE application records 134 from multiple CAE application libraries 122 are incorporated into multiple program databases 140 in native formats. This results in potentially different formats for component instantiation data 156 in each program database 140. Any component dataset 142 in any program database 140, however, may be linked through link table 146 to any other component dataset 142 or combination of component datasets 142 in any program database 140 or combination of program databases 140. Such linking is not feasible with independent CAE application libraries 122. This linking process is discussed in detail hereinbelow.

Task 268 completes hypertask 262 (FIG. 12) and control returns to hypertask 240 (FIG. 9), and thence to hypertask 230 (FIG. 6). The following discussion refers to FIGS. 2 and 6.

Following hypertask 240, control returns to task 232. If task 232 determines that another component 136 is instantiated by CAE application library 122 and not by program database 140, then hypertasks 234 and 240 are repeated for that other component 136. If task 232 determines that all components 136 instantiated by CAE application library 122 are instantiated by program database 140, then hypertask 230 (FIG. 6) is complete and control returns to subprocess 216 (FIG. 5). The following discussion refers to FIGS. 2 and 5.

Once all CAE application records 134 in CAE application library 122 have been encompassed within program database 140, a task 270 disassociates CAE application library 122 from CAE application program 120. Since this may leave CAE application program 120 without CAE application library 122, the original CAE application 118 is nonfunctional. However, a CAE product library 128 is desirably generated to make product-specific CAE application 118' fully functional before product-specific CAE application 118' is executed. This is discussed in greater detail hereinbelow.

Figure 14:
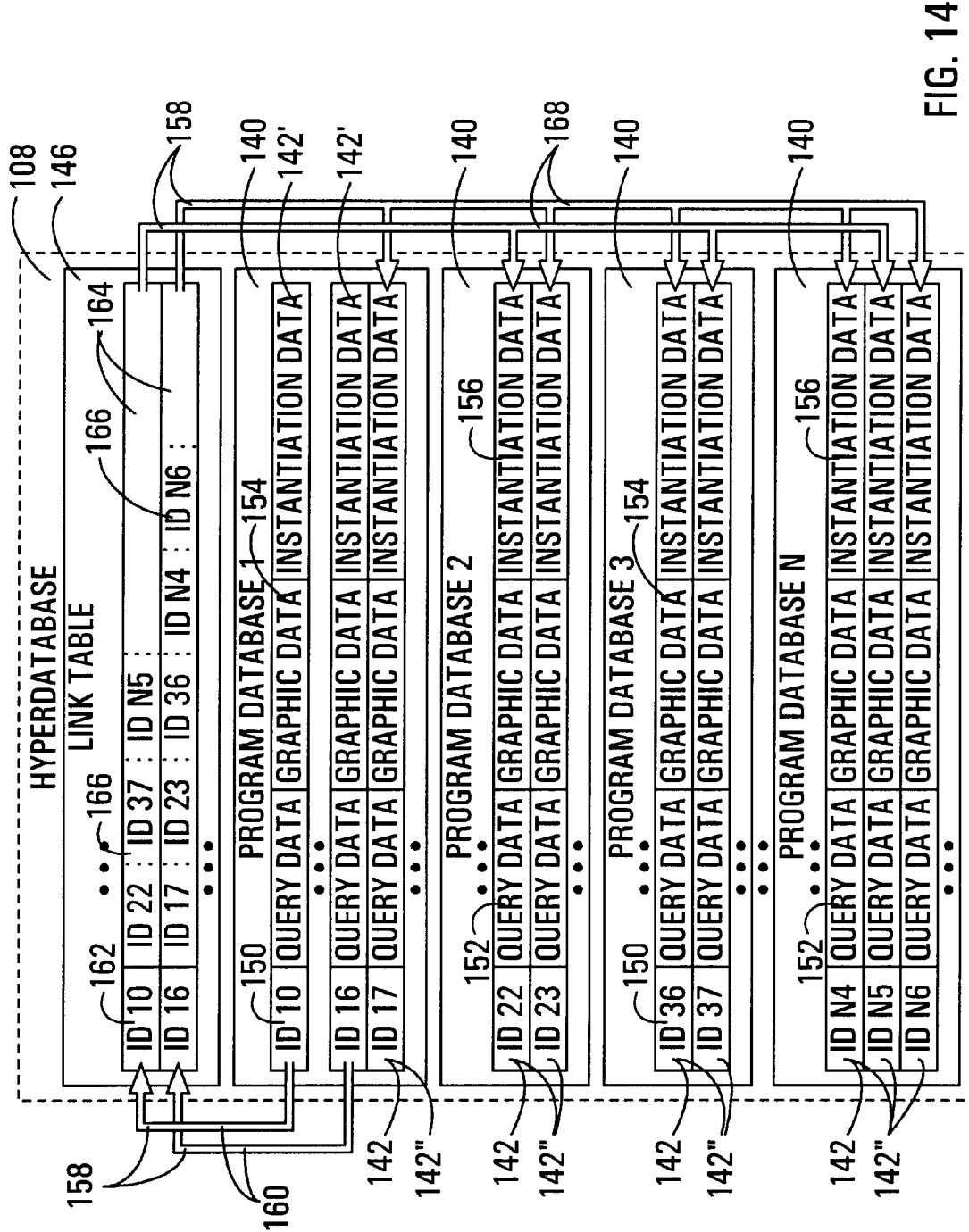
FIG. 14 depicts a block diagram demonstrating links between component datasets in multiple program databases within a hyperdatabase in accordance with a preferred embodiment of the present invention.

Following task 270, a hypertask 272 generates data links 158 between component datasets 142 and link table 146. FIG. 13 depicts a flowchart demonstrating hypertask 272, and FIG. 14 depicts a block diagram demonstrating data links 158 between component datasets 142 in multiple program databases 140 within a hyperdatabase 108, in accordance with a preferred embodiment of the present invention. The following discussion refers to FIGS. 2, 13, and 14.

Within hypertask 272, a query task 274 determines if a component dataset 142 in program database 140 lacks a primary data link 160. That is, hypertask 272 determines if there exists a component dataset 142 with no primary data link 160 between the component dataset 142 and link table 146.

If task 274 determines that there is an unlinked component dataset 142, then a task 276 extracts component identifier 150 from that component dataset 142, which component dataset 142 is a primary component dataset 142'. A task 278 then establishes primary data link 160 by allocating component identifier 150 (FIG. 8) extracted from primary component dataset 142' as a primary link identifier 162 in a link record 164 of link table 146.

A query task 280 then determines if there exists in hyperdatabase 108 a component dataset 142 other than primary component dataset 142' not checked for a link with primary component dataset 142'.

If task 280 determines that such an unchecked component dataset 142 exists, then a query task 282 determines if unchecked component dataset 142 should be linked with primary component dataset 142'.

If task 282 determines that unchecked component dataset 142 should be linked with primary component dataset 142', then a task 284 extracts component identifier 150 from that component dataset 142, which component dataset 142 is a secondary component dataset 142".

A task 286 then allocates component identifier 150 extracted from secondary component dataset 142" as a secondary link identifier 166 in link record 164 containing primary link identifier 162. This establishes a secondary data link 168 between link record 164 and secondary component dataset 142".

The unchecked component dataset 142 (i.e., the component dataset 142 under evaluation) should be a secondary component dataset 142" linked with a primary component dataset 142' when a component 136 instantiated by the secondary component dataset 142" has a significant and germane relationship to a component 136 instantiated by the primary component dataset 142'. Assuming for example that the primary component dataset 142' instantiates an assembly and the unchecked component dataset 142 instantiates a component 136 that is a part of that assembly, then if the germane relationship is that of parent to child, i.e., assembly to components making up that assembly, the unchecked component dataset 142 should be linked to the primary component dataset 142' as a secondary component dataset 142". If, on the other hand, the germane relationship is that of child to parent, i.e., component to assemblies using that component, the unchecked component dataset 142 should not be linked to the primary component dataset 142'. Task 282 normally makes such determinations with the help of human interaction 124 (FIG. 1).

Following task 286, control returns to task 280 to determine if there exists in hyperdatabase 108 another component dataset 142 not checked for a link with primary component dataset 142'. If task 280 determines that no unchecked component datasets 142 exist for primary component dataset 142', then control returns to task 274 to determine if another component dataset 142 is unlinked. If task 274 determines that there are no further unlinked component datasets 142, then hypertask 272 (FIG. 13) is complete and control returns to subprocess 216 (FIG. 5), and thence to process 200 (FIG. 3). The following discussion refers to FIGS. 2 and 3.

Following subprocess 216, control returns to loop 206. If task 208 determines another CAE application library 122 is to be incorporated into hyperdatabase 108, subprocess 216 is repeated.

Figure 15:
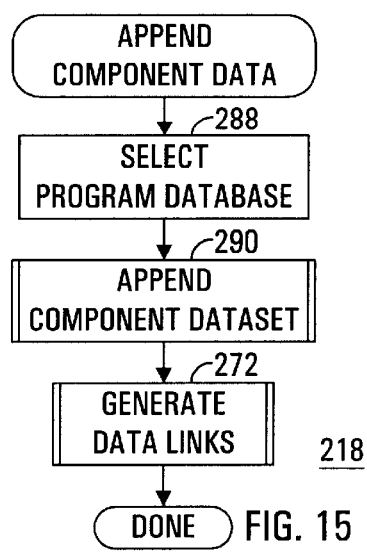
FIG. 15 depicts a flowchart demonstrating a subprocess for appending component data to an existing program database in accordance with a preferred embodiment of the present invention.

If task 210 determines that component data is to be appended to an already existing program database 140, then component-appending subprocess 218 appends the component data. FIG. 15 depicts a flowchart demonstrating subprocess 218 in accordance with a preferred embodiment of the present invention. The following discussion refers to FIGS. 2 and 15.

It is desirable to append component data to an already-existing program database 140 whenever a new component 136 becomes available. Such a new component 136 may represent an addition to the original CAE application library 122 from which the data in the program database 140 was extracted. Alternatively, a new component 136 may represent a component not available in the original CAE application library 122, such as a manufactured component 136 (e.g., a bare printed circuit board), an assembly of other components 136, or a finished product. In any event, the primary advantage of appending a component 136 to an already existing program database 140 is to maintain all data and links previously established.

Within subprocess 218, a task 288 selects the specific program database 140 to which the component data is to be added. Any number of ways of selecting program database 140 well known to those skilled in the art may be used. For example, if program database 140 is associated with a CAE schematic-drawing application 118, then selecting program database 140 based upon component graphic data 154 may be desirable.

Figure 16:
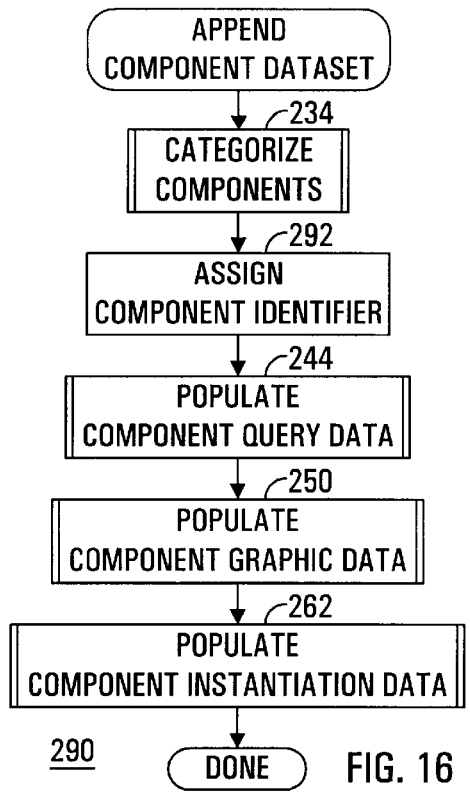
FIG. 16 depicts a flowchart demonstrating a hypertask for appending a component dataset to an existing program database in accordance with a preferred embodiment of the present invention.

Following task 288, a hypertask 290 appends a component dataset 142 to program database 140. FIG. 16 depicts a flowchart demonstrating hypertask 290 in accordance with a preferred embodiment of the present invention. The following discussion refers to FIGS. 2, 7, 8, 10, 11, 12, and 16.

Within hypertask 290 (FIG. 7), hypertask 234 (FIG. 7) categorizes component 136 instantiated by the component dataset 142 to be appended.

Following hypertask 234, a task 292 assigns a unique component identifier 150 to the appended component dataset 142. Next, hypertask 244 (FIG. 10) populates component dataset 142 with component query data 152, hypertask 250 (FIG. 11) populates component dataset 142 with component graphic data 154, and hypertask 262 populates component dataset 142 with component instantiation data 156. Control then returns to subprocess 218 (FIG. 15).

Hypertask 272 (FIG. 13) generates data links 158 between the appended component dataset 142 and link table 146. After hypertask 272, control returns to subprocess 218 (FIG. 15), and thence to process 200 (FIG. 3), where control returns to monitoring loop 206. The following discussion refers to FIGS. 2 and 3.

If task 210 determines that further component data is to be appended, then subprocess 218 is repeated accordingly.

Figure 17:
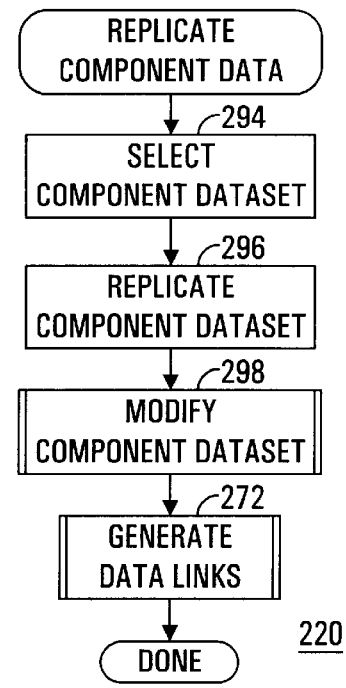
FIG. 17 depicts a flowchart demonstrating a subprocess for replicating existing component data in accordance with a preferred embodiment of the present invention.

If task 212 determines that existing component data is to be replicated, then component-replicating subprocess 220 replicates the component data. FIG. 17 depicts a flowchart demonstrating subprocess 220 in accordance with a preferred embodiment of the present invention. The following discussion refers to FIGS. 2 and 17.

Replicating a component dataset 142 is similar to appending a component dataset 142, save that the replicate component dataset is pre-loaded with component data from the original component dataset 142. That is, immediately after replication, there are two component datasets 142, the original and the replicate, identically instantiating a specific component 136. Modification of the data in the replicate component dataset 142 then varies this instantiation. After replication, the original component dataset 142 maintains all pre-existing data links 158, while the replicate component dataset 142 is unlinked and must be linked accordingly.

Those skilled in the art will appreciate that it may be desirable to replicate, rather than append, a component dataset 142 for a new component 136, especially when that new component 136 is very similar to an existing component 136. For example, if a component dataset 142 instantiating a 47 kilohm, ¼ watt, 1%, metal-film, axial-lead resistor is to be added to a program database 140 already possessing a component dataset 142 instantiating a 47 kilohm, ¼ watt, 1%, carbon-film, axial-lead resistor, it may be faster and easier to replicate and modify the carbon-film resistor component dataset 142 via subprocess 220 than to append a completely new component dataset 142 via subprocess 218. Process 200 makes such decisions with the help of human interaction 124 (FIG. 1).

It may be desirous to totally replicate a component dataset 142, thus providing two identical component datasets 142 instantiating a given component 136 in exactly the same way. This would allow the second (replicate) component dataset 142 to be linked in an entirely different manner. For example, an assembly may be a component 136 to two different final products. With child to parent linking, it is desirable that the assembly be instantiated by a first component dataset 142 having a data link 158 to a component dataset 142 instantiating the first final product, and also be instantiated by a second component dataset 142 having a data link 158 to the component dataset 142 instantiating the second final product. In another example, an assembly may be a component 136 of a final product while also having components 136 within itself. It is desirable that the assembly be instantiated by a first component dataset 142 having a data link 158 upward to the component dataset 142 instantiating the final product, and be instantiated by a second component dataset 142 having data links 158 downward to component datasets 142 instantiating each of the components 136 making up the assembly. The use of replicate component datasets 142, therefore, permits multiple data links 158 in a manner not possible with independent CAE application libraries 122.

Within subprocess 220, a task 294 selects the specific component dataset 142 to be replicated. Any number of ways of selecting program database 140 well known to those skilled in the art may be used. Once task 294 has selected the component dataset 142 to be replicated, a task 296 replicates that component dataset 142. That is, task 296 creates a replicate component dataset 142 and populates it with all the data of the original component dataset 142.

Figure 18:
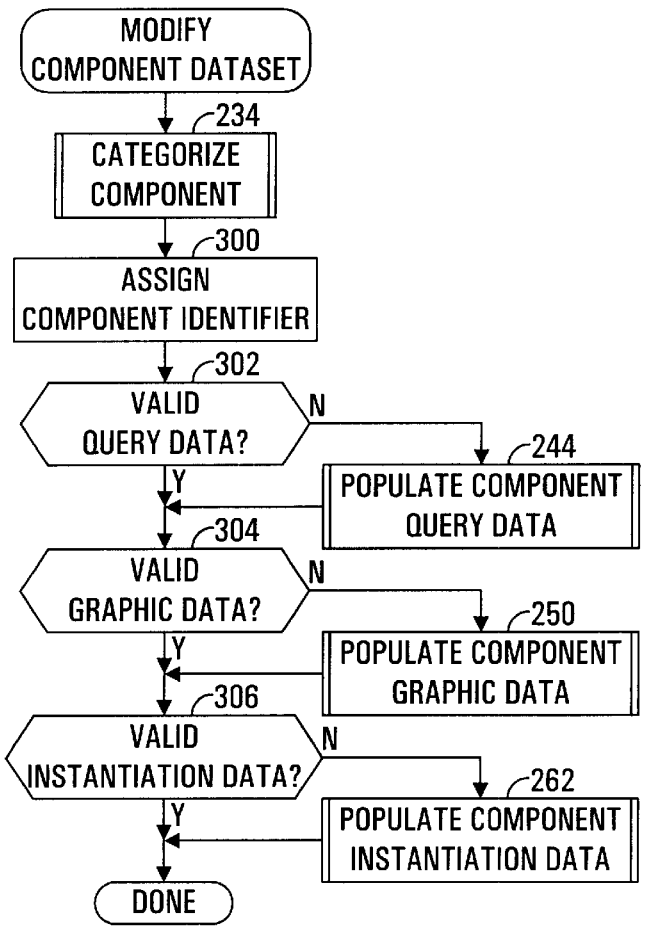
FIG. 18 depicts a flowchart demonstrating a hypertask for modifying a component dataset in accordance with a preferred embodiment of the present invention.

A hypertask 298 then modifies the replicate component dataset 142. FIG. 18 depicts a flowchart demonstrating hypertask 298 in accordance with a preferred embodiment of the present invention. The following discussion refers to FIGS. 2, 7, 8, 10, 11, 12, and 18.

Within hypertask 298, hypertask 234 (FIG. 7) categorizes component 136 instantiated by the replicate component dataset 142. Following hypertask 234, a task 300 assigns a unique component identifier 150 to the replicate component dataset 142, replacing the replicate component identifier 150.

In a query task 302, process 200, with the help of human interaction 124 (FIG. 1), then determines if replicate component query data 152 is valid. If task 302 determines that replicate component query data 152 is not valid, then hypertask 244 (FIG. 10) populates component dataset 142 with valid component query data 152.

After hypertask 244 or if task 302 determines that component query data 152 is valid, a query task 304 then determines if replicate component graphic data 154 is valid. If task 304 determines that replicate component graphic data 154 is not valid, then hypertask 250 (FIG. 11) populates component dataset 142 with valid component graphic data 154.

After hypertask 250 or if task 304 determines that component graphic data 154 is valid, a query task 306 then determines if replicate component instantiation data 156 is valid. If task 306 determines that replicate component instantiation data 156 is not valid, then hypertask 262 (FIG. 12) populates component dataset 142 with component instantiation data 156.

After hypertask 262 or if task 306 determines that component instantiation data 156 is valid, control returns to subprocess 220 (FIG. 17).

After hypertask 298, hypertask 272 (FIG. 13) generates data links 158 between the replicated component dataset 142 and link table 146. Hypertask 272 completes subprocess 220 (FIG. 17), and control returns to process 200 (FIG. 3) and monitoring loop 206. The following discussion refers to FIGS. 2 and 3.

If task 212 determines that further component data is to be replicated, then subprocess 220 is repeated accordingly.

Figures 19, 20:
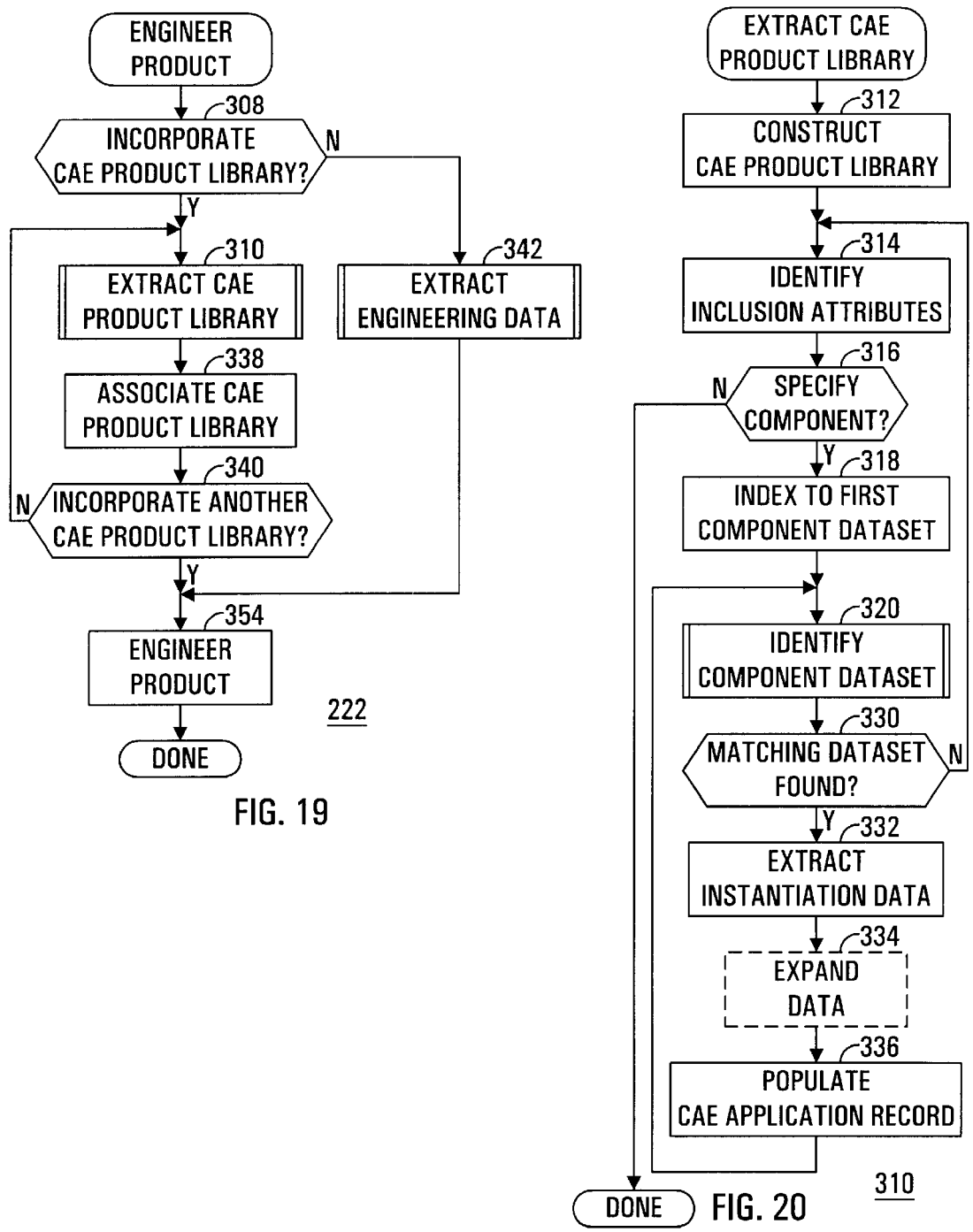
FIG. 19 depicts a flowchart demonstrating a subprocess for engineering a product in accordance with a preferred embodiment of the present invention.
FIG. 20 depicts a flowchart demonstrating a hypertask for extracting a computer-aided-engineering product library from a program database in accordance with a preferred embodiment of the present invention.

In query task 214, process 200 determines, with help from human interaction 124, when product 126 is to be engineered. When task 214 determines that product 126 is to be engineered, product-engineering subprocess 222 engineers product 126. FIG. 19 depicts a flowchart demonstrating subprocess 222 in accordance with a preferred embodiment of the present invention. The following discussion refers to FIGS. 2 and 19.

Within subprocess 222, a query task 308 determines if the engineering of product 126 incorporates a CAE product library 128. That is, through task 308, process 200 determines, with help from human interaction 124, if the specific engineering service 102 to be used to engineer product 126 encompasses a product-specific CAE application 118'. If query task 308 determines that CAE product library 128 is to be used in engineering service 102, then a hypertask 310 extracts CAE product library 128 from program database 140 associated with CAE application program 120 of the appropriate product-specific CAE application 118'. FIG. 20 depicts a flowchart demonstrating hypertask 310 in accordance with a preferred embodiment of the present invention. The following discussion refers to FIGS. 2 and 20.

Within hypertask 310, a task 312 constructs a CAE product library 128 to receive the extracted data. Following task 312, a task 314 identifies inclusion attributes (not shown), i.e., component attributes 148 of one component 136 to be included among those components 136 instantiated by CAE product library 128.

Figure 21:
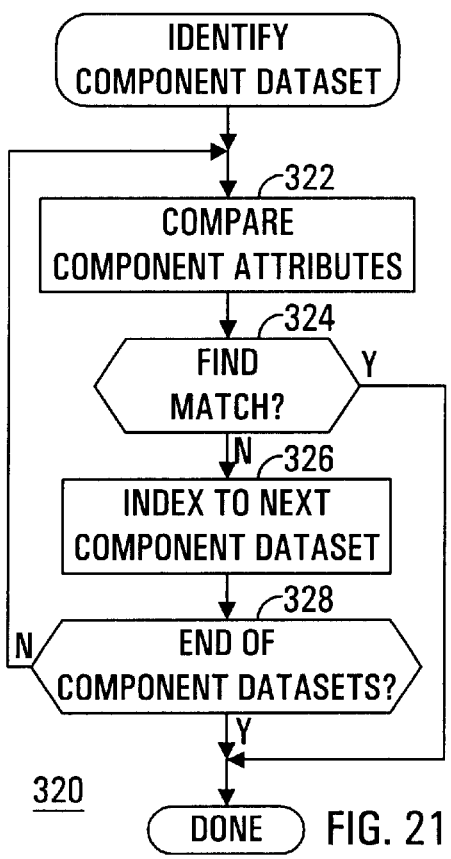
FIG. 21 depicts a flowchart demonstrating a hypertask for selecting a component dataset in accordance with a preferred embodiment of the present invention.
Figure 22:
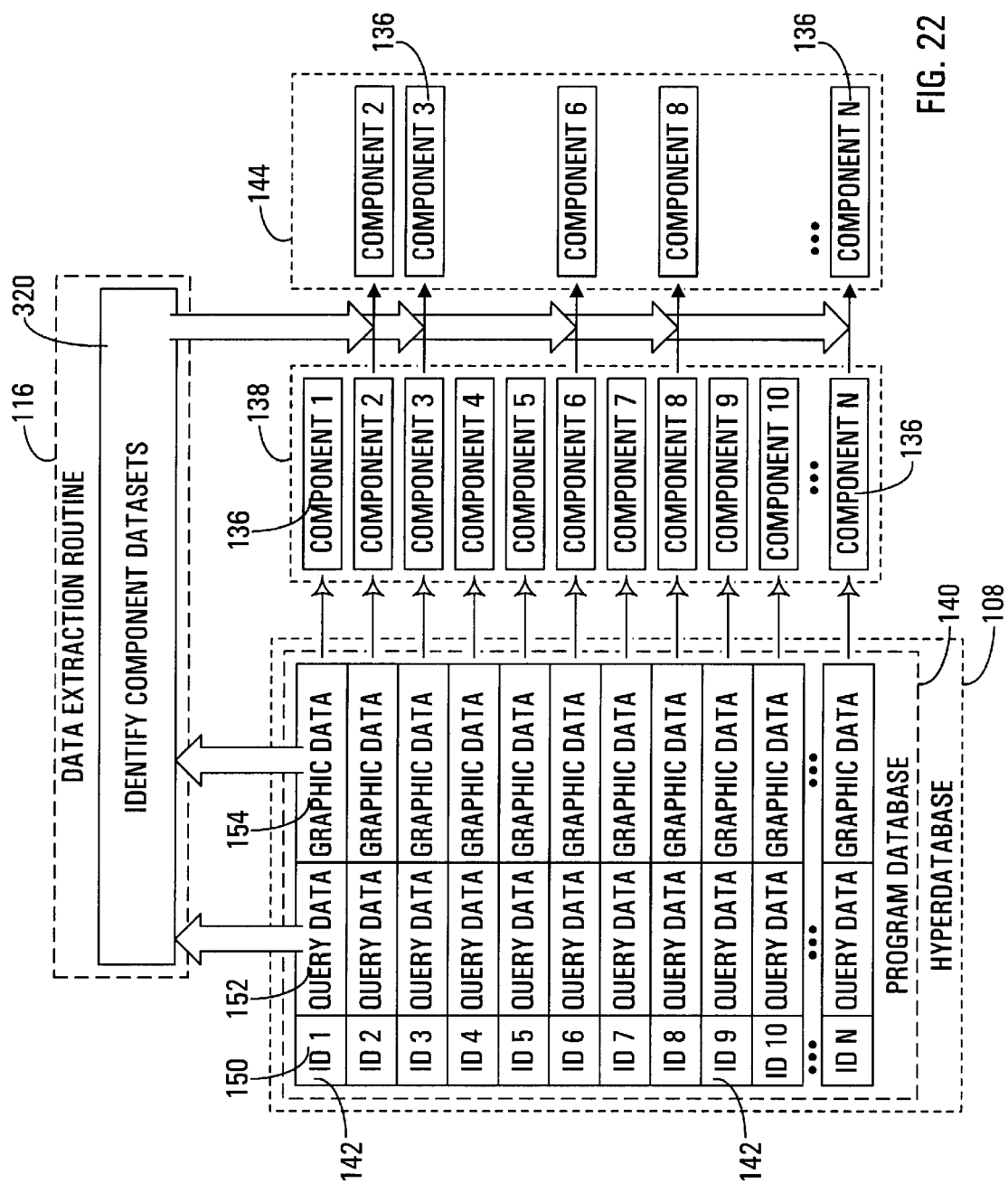
FIG. 22 depicts a block diagram demonstrating the selection of components via a data extraction routine in accordance with a preferred embodiment of the present invention.

A query task 316 then determines if component attributes 148 have been specified for that one component 136, i.e., if there is a specified component 136 to be instantiated. If task 316 determines that one component 136 has been specified, then a task 318 indexes to the first component dataset 142 in program database 140 associated with CAE application program 120 with which CAE product library 128 will be used. Following task 318, a hypertask 320 identifies component dataset 142. FIG. 21 depicts a flowchart demonstrating hypertask 320, and FIG. 22 depicts a block diagram demonstrating the selection of components 136 via data extraction routine 116, in accordance with a preferred embodiment of the present invention. The following discussion refers to FIGS. 2, 21, and 22.

Within hypertask 320, a task 322 compares selected ones of component attributes 148 against component attributes 148 within component query data 152 within component dataset 142. Additionally, task 322 may compare selected graphic data against component graphic data 154 within component dataset 142.

Following task 322, a query task 324 determines if a match exists between the selected ones of component attributes 148 and component attributes 148 within component dataset 142. If task 324 determines that no match exists, then a task 326 indexes to the next component dataset 142. A query task 328 then determines if component datasets 142 have come to an end, i.e., all component datasets 142 have been checked for a match. If task 328 determines that all component datasets 142 have not been checked, then control loops back to task 322, and tasks 322, 324, 326, and 328 are repeated accordingly.

If task 328 determines that all component datasets 142 have been checked or if task 324 determines that a matching component dataset 142 exists, hypertask 320 (FIG. 21) is complete and control returns to hypertask 310 (FIG. 20).

Figure 23:
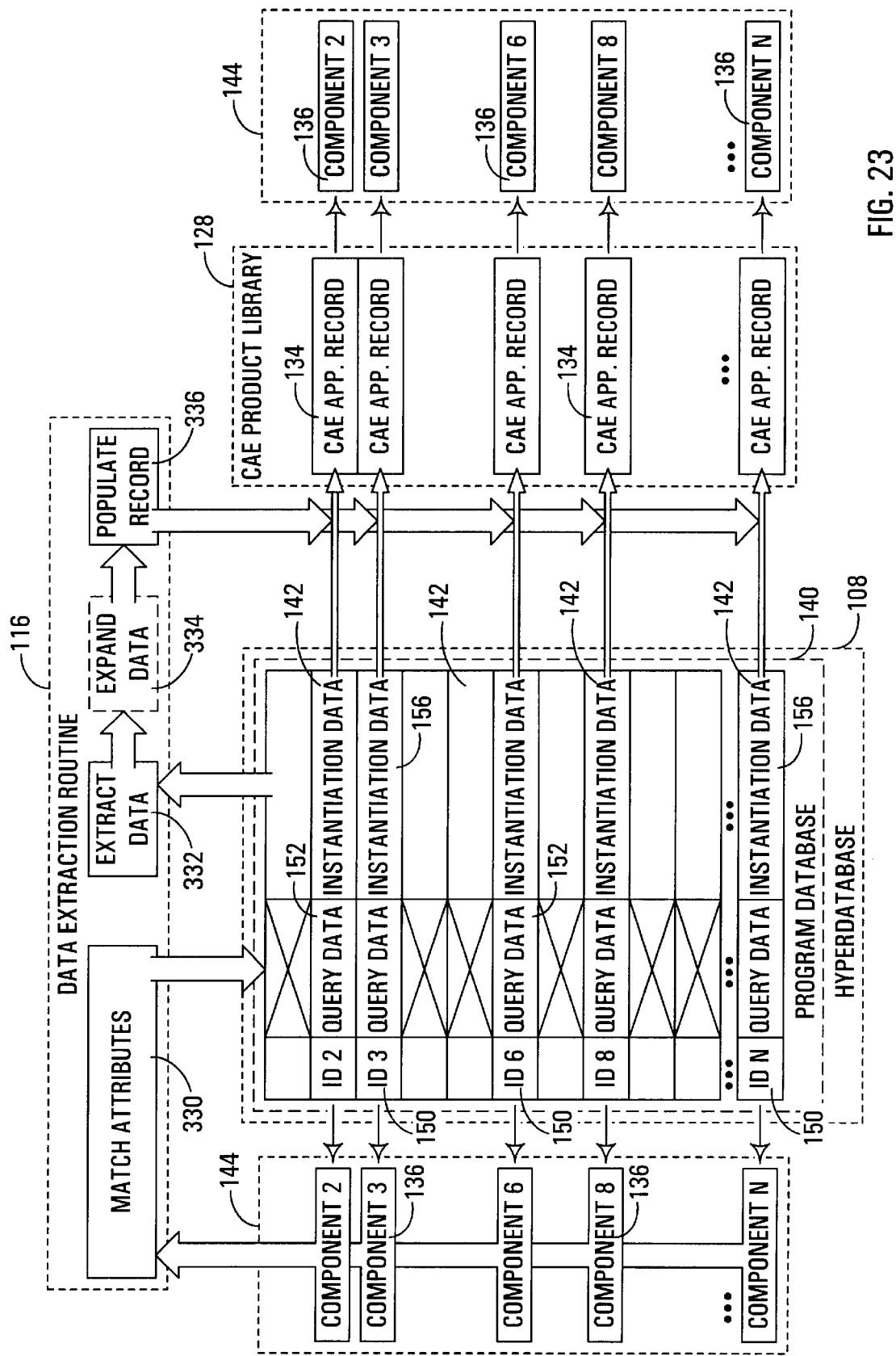
FIG. 23 depicts a block diagram demonstrating the extraction of a CAE product library from a program database via a data extraction routine in accordance with a preferred embodiment of the present invention.

FIG. 23 depicts a block diagram demonstrating the extraction of CAE product library 128 from program database 140 via data extraction routine 116 in accordance with a preferred embodiment of the present invention. The following discussion refers to FIGS. 2, 20, and 23

Following hypertask 320, a query task 330 determines if hypertask 320 found a matching component dataset 142. If task 330 determines that a matching component dataset 142 was found, then a task 332 extracts component instantiation data 156 from component dataset 142. If original CAE application record 134 was compressed by optional data-compressing task 266 (FIG. 12) during the loading of component instantiation data 156 into component dataset 142, then an optional task 334 expands extracted component instantiation data 156. If original CAE application record 134 was not compressed, i.e., optional data-compressing task 266 was not used, then task 334 is ignored.

A task 336 then populates a CAE application record 134 in CAE product library 128 with component instantiation data 156. Following task 336, control loops back to hypertask 320, and hypertask 320 and tasks 330, 332, 334, and 336 are repeated for any other component dataset 142 instantiating component 136.

If task 330 determines that all component datasets 142 instantiating component 136 have been found, then control loops back to task 314. Tasks 314, 316, and 318, hypertask 320, and tasks 330, 332, 334, and 336 are repeated for any other component dataset 142 instantiating a component 136 designated for inclusion among those components instantiated by CAE product library 128.

If task 316 determines that no further components 136 are specified, then hypertask 310 (FIG. 20) is complete and control returns to subprocess 222 (FIG. 19). The following discussion refers to FIGS. 2 and 19.

Following hypertask 310, a task 338 associates CAE product library 128 with CAE application program 120. That is CAE product library 128 is made available to CAE application program 120 as though it were the original CAE application library 122 for that CAE application program 120. In this way, product-specific CAE application 118' is formed and made ready for use as a part of engineering service 102.

A query task 340 then determines if another CAE product library 128 is to be extracted. If task 340 determines that another CAE product library 128 is to be extracted, then control loops back to hypertask 310, and hypertask 310 and task 338 are repeated for that other CAE product library 128.

Figure 24:
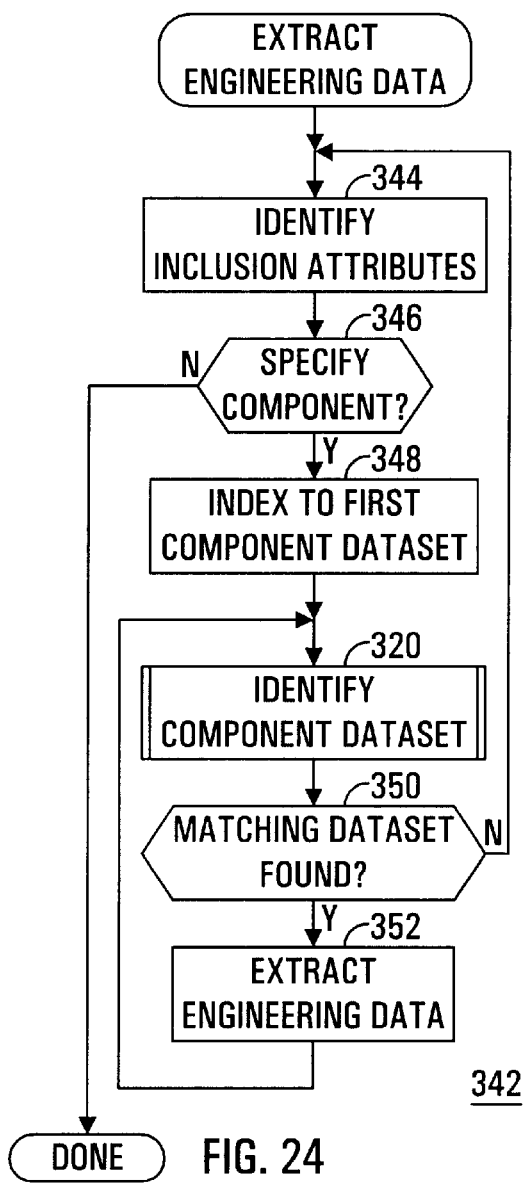
FIG. 24 depicts a flowchart demonstrating a hypertask for extracting engineering data from a program database in accordance with a preferred embodiment of the present invention.

If task 308 determines that no CAE product library 128 is to be used in engineering service 102, then a hypertask 342 extracts engineering data 132 from hyperdatabase 108. FIG. 24 depicts a flowchart demonstrating hypertask 342 in accordance with a preferred embodiment of the present invention. The following discussion refers to FIGS. 2 and 24.

Within hypertask 342, a task 344 identifies inclusion attributes (not shown), i.e., component attributes 148 of one component 136 to be included within engineering data 132. A query task 346 then determines if component attributes 148 have been specified for that one component 136. If task 346 determines that component attributes 148 for that one component 136 have been specified, then a task 348 indexes to the first component dataset 142. Following task 348, hypertask 320 (FIG. 21) identifies component dataset 142.

Following hypertask 320, a query task 350 determines if hypertask 320 found a matching component dataset 142. If task 350 determines that a matching component dataset 142 was found, then a task 352 extracts engineering data 132 from component dataset 142.

Task 352 completes hypertask 342 (FIG. 24) and control returns to subprocess 222 (FIG. 19). The following discussion refers to FIGS. 2 and 19.

If task 340 determines that hypertask 310 has extracted all CAE product libraries 128, or if after hypertask 342 has extracted engineering data 132, then in a task 354 product 126 is engineered by the application of appropriate engineering services 102 and the use of appropriate engineering instruments In summary, the present invention teaches a process 200 for using a system 100 for the coordination of engineering services 102 across multiple disciplines for the computer-aided engineering of a product 126 or plurality of products 126. System 100 utilizes a hyperdatabase 108 to manage a large number of independent libraries 122 for CAE applications 118, wherein each CAE application library 122 is encompassed in an individual program database 140 in hyperdatabase 108. System 100 also incorporates a data extraction routine 116 to extract CAE product libraries 128 that are product-specific subsets of the original CAE application libraries 122. The present invention also teaches cross-linking component datasets 142 instantiating components 136 instantiated by one CAE application library 122 with component datasets 142 instantiating like components 136 instantiated by other CAE application libraries 122. The present invention also teaches a methodology for expanding a given program database 140 without affecting the integrity of that program database 140.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for coordinating engineering services, said services being provided using a plurality of computer-aided engineering (CAE) application programs, each of said CAE application programs having one of a plurality of CAE application libraries, each of said CAE application libraries containing a plurality of CAE application records, and each of said CAE application records instantiating one of a plurality of components, said method comprising:

creating a hyperdatabase;

constructing, within said hyperdatabase, a link table having a plurality of link records;

generating, within said hyperdatabase, a program database associated with one of said CAE application programs;

populating said program database with a plurality of component datasets, wherein each of said component datasets instantiates one of said components;

generating, within said link table, a link between one of said component datasets instantiating one of said components in one of said program databases and others of said component datasets instantiating said one component in another of said program databases;

repeating said database-generating operation, said database-populating operation, and said link-generating operation for others of said CAE application libraries; and engineering a product utilizing data contained in selected ones of said component datasets, said product-engineering operation being coordinated through said links in said hyperdatabase.

2. An engineering services coordinating method as claimed in claim 1 wherein said database-populating operation comprises:

populating one of said component datasets with data associated with one of said CAE application records of said one CAE application library; and repeating said dataset-populating operation for another of said CAE application records of said one CAE application library.

3. An engineering services coordinating method as claimed in claim 2 wherein said dataset-populating operation comprises:

assigning, to one component dataset, a component identifier configured to uniquely identify said one component dataset in said hyperdatabase;

populating said one component dataset with component query data associated with said component identifier;

populating said one component dataset with component graphic data associated with said component identifier; and populating said one component dataset with component instantiation data associated with said component identifier and with said one CAE application record in said one CAE application library instantiating said one component.

4. An engineering services coordinating method as claimed in claim 3 wherein:

said method additionally comprises categorizing, prior to said dataset-populating operation, each of said components by a first plurality of component attributes; and said query-data-populating operation comprises allocating a second plurality of component attributes to said component query data, wherein said first plurality is equal to or greater than said second plurality, and wherein each of said second plurality component attributes instantiates different ones of said first plurality component attributes categorizing said each component.

5. An engineering services coordinating method as claimed in claim 4 wherein said component-categorizing operation comprises deriving each of said component attributes from data in said one CAE application record.

6. An engineering services coordinating method as claimed in claim 3 wherein said graphic-data-populating operation comprises:

extracting said component graphic data from said one CAE application record;

structuring said component graphic data in said one component dataset to have a predetermined graphic data format; and allocating said component graphic data associated with said component identifier to said one component dataset.

7. An engineering services coordinating method as claimed in claim 6 wherein said predetermined graphic data format is a computer graphic metafile format.

8. An engineering services coordinating method as claimed in claim 3 wherein said instantiation-data-populating operation comprises:
   extracting said one CAE application record instantiating said one component from said one CAE application library; and
   allocating said one CAE application record to said one component dataset as said component instantiation data.

9. An engineering services coordinating method as claimed in claim 8 wherein:
   said one CAE application record resides in said one CAE application library in a CAE application format native to said one CAE application program; and
   said component instantiation data retains said CAE application format.

10. An engineering services coordinating method as claimed in claim 1 additionally comprising, following said database-populating operation, disassociating said one CAE application library from said one CAE application program.

11. An engineering services coordinating method as claimed in claim 1 wherein said link-generating operation comprises:
   extracting a component identifier associated with said one component dataset associated with said one component;
   allocating said component identifier to one of said link records of said link table as a primary link identifier;
   extracting another component identifier associated with one of said others of said component datasets associated with said one component;
   allocating said other component identifier to said one link record as a secondary link identifier;
   repeating said secondary-identifier-extracting operation and said secondary-identifier-allocating operation for remaining others of said component datasets associated with said one component; and
   repeating said primary-identifier-extracting operation, said primary-identifier-allocating operation, said secondary-identifier-extracting operation, said secondary-identifier-allocating operation, and said secondary-identifier-repeating operation for others of said component datasets associated with others of said components.

12. An engineering services coordinating method as claimed in claim 1 additionally comprising:
   determining if one of said component datasets instantiating one of said components is to be appended to one of said program databases;
   selecting, when said component-appending determining operation determines said one component dataset is to be appended, said one program database to which said one component dataset is to be appended; and
   appending said one component dataset to said one program database to produce an appended one of said component datasets.

13. An engineering services coordinating method as claimed in claim 12 wherein said link-generating operation generates, within said link table, a link between said appended one of said component datasets instantiating said one component in said one program database and others of said component datasets instantiating said one component in another of said program databases.

14. An engineering services coordinating method as claimed in claim 12 wherein said dataset-appending operation comprises:
   categorizing said one component by a first plurality of component attributes, wherein each of said component attributes is derived from data in said one CAE application record;
   assigning, to said appended one of said component datasets, a component identifier configured to uniquely identify said appended one of said component datasets in said hyperdatabase;
   populating said appended one of said component datasets with component query data associated with said component identifier and comprising a second plurality of component attributes, wherein said first plurality is greater than or equal to said second plurality, and wherein each of said second plurality component attributes instantiates different ones of said first plurality component attributes categorizing said one component;
   populating said appended one of said component datasets with component graphic data associated with said component identifier wherein said component graphic data is extracted from said one CAE application record and structured to have a predetermined graphic data format; and
   populating said appended one of said component datasets with component instantiation data associated with said component identifier, wherein said component instantiation data is extracted from said one CAE application record instantiating said one component from said one CAE application library.

15. An engineering services coordinating method as claimed in claim 1 additionally comprising:
   ascertaining if one of said component datasets in one of said program databases is to be replicated;
   selecting, when said component-replicating ascertaining operation determines said one component dataset is to be replicated, said one program database in which said one component dataset is to be replicated;
   replicating said one component dataset within said one program database to produce a replicated one of said component datasets instantiating said one component; and
   modifying said replicated one of said component datasets.

16. An engineering services coordinating method as claimed in claim 15 wherein said link-generating operation generates, within said link table, a link between said replicated one of said component datasets instantiating said one component in said one program database and others of said component datasets instantiating said one component in another of said program databases.

17. An engineering services coordinating method as claimed in claim 1 wherein said method, prior to said product-engineering operation, additionally comprises extracting, for a product, a CAE product library for one of said CAE application programs from said program database associated with said one CAE application program.

18. An engineering services coordinating method as claimed in claim 17 wherein said library-extracting operation comprises:
   constructing said CAE product library configured for use with said one CAE application program, wherein said CAE product library is associated with selected ones of said components;

identifying, in said one program database, a component dataset associated with one of said selected ones of said components;

populating a CAE application record in said CAE product library with data from said component dataset identified by said dataset-identifying operation; and repeating said dataset-identifying operation and said record-populating operation for other ones of said selected ones of said components.

19. An engineering services coordinating method as claimed in claim 17 additionally comprising, following said library-extracting operation, associating said CAE product library with said one CAE application program.

20. An engineering services coordinating method as claimed in claim 17 wherein said method, following said library-extracting operation, additionally comprises repeating, for said product, said library-extracting operation to extract another CAE product library for another of said CAE application programs from said program database associated with said other CAE application program.

21. An engineering services coordinating method as claimed in claim 17 wherein said method, following said product-engineering operation, comprises repeating said library-extracting operation and said product-engineering operation for other products.

22. A system for coordinating engineering services provided using a plurality of computer-aided engineering (CAE) application programs, each of said CAE application programs having one of a plurality of CAE application libraries, each of said CAE application libraries containing a plurality of CAE application records, and each of said CAE application records instantiating one of a plurality of components, said system comprising:

a first segment of a computer-readable medium, wherein said first segment is configured as a hyperdatabase;

a second segment of said computer-readable medium, wherein said second segment is configured as a data input routine that incorporates one of said CAE application libraries into said hyperdatabase;

a third segment of said computer-readable medium, wherein said third segment is configured as a data extraction routine that extracts CAE product libraries from said hyperdatabase, wherein each of said CAE product libraries is configured for use with one of said CAE application programs; and an engineering instrument, responsive to one of said CAE product libraries, for engineering a product.

23. An engineering services coordinating system as claimed in claim 22 wherein:

said hyperdatabase comprises a plurality of program databases, wherein each of said program databases is associated with one of said CAE application programs;

each of said program databases comprises a plurality of component datasets, wherein each of said component datasets instantiates one of said components;

said hyperdatabase additionally comprises a link table having a plurality of link records; and each of said link records comprises a link between one of said component datasets instantiating one of said components in one of said program databases and others of said component datasets instantiating said one component in another of said program databases.

24. An engineering services coordinating system as claimed in claim 23 wherein one of said component datasets comprises:

a component identifier configured to uniquely identify said one component dataset in said hyperdatabase;

component query data associated with said component identifier;

component graphic data associated with said component identifier; and component instantiation data associated with said component identifier and incorporating one of said CAE application records in said one CAE application library instantiating said one component.

25. An engineering services coordinating system as claimed in claim 24 wherein:

each of said components are categorized by a first plurality of component attributes derived from data in said one CAE application record; and said data input routine populates said component query data in said one component dataset with a second plurality of component attributes instantiating different ones of said first plurality component attributes categorizing said each component.

26. An engineering services coordinating system as claimed in claim 24 wherein said data input routine populates said component graphic data in said one component dataset with data derived from said one CAE application record.

27. An engineering services coordinating system as claimed in claim 24 wherein said data input routine populates said component instantiation data in said one component dataset with said one CAE application record.

28. An engineering services coordinating system as claimed in claim 27 wherein:

said one CAE application record resides in said one CAE application library in a CAE application format native to said one CAE application program; and said component instantiation data is populated with said one CAE application record in said CAE application format.

29. An engineering services coordinating system as claimed in claim 23 wherein:

each of said link records comprises a primary link identifier associated with a component identifier in said one component dataset associated with said one component; and each of said link records additionally comprises a secondary link identifier associated with a component identifier with said other component dataset associated with said one component.

30. An engineering services coordinating system as claimed in claim 23 wherein said data extraction routine extracts said CAE product library for said one of said CAE application programs from said program database associated with said one CAE application program.

31. An engineering services coordinating system as claimed in claim 23 wherein said data extraction routine extracts, from one of said program databases, one of said CAE product libraries associated with one of said products, wherein said one CAE product library is configured for use with one of said CAE application programs.

32. A method for coordinating engineering services by a hyperdatabase containing a plurality of program databases, wherein each of said program databases encompasses one of a plurality of computer-aided engineering (CAE) application libraries associated with one of a plurality of CAE application programs, wherein each of said program databases incorporates a plurality of component datasets, wherein said one CAE application library contains a plurality of CAE application records, and wherein each of said component datasets encompasses one of said CAE application records instantiating one of a plurality of components, said method comprising the steps of:

assigning, to said one component dataset, a component identifier configured to uniquely identify said one component dataset in said hyperdatabase;

populating said one component dataset with component query data associated with said component identifier;

populating said one component dataset with component graphic data associated with said component identifier;

populating said one component dataset with component instantiation data associated with said component identifier and with said one CAE application record in said one CAE application library instantiating said one component;

repeating said identifier-assigning step, said query-data-populating step, said graphic-data-populating step, and said instantiation-data-populating step for another of said CAE application records of said one CAE application library;

repeating said identifier-assigning step, said query-data-populating step, said graphic-data-populating step, said instantiation-data-populating step, and said dataset-populating-repeating step for others of said program databases associated with others of said CAE application libraries;

extracting, for a product incorporating selected ones of said components, a CAE product library for one of said CAE application programs from said one program database containing said one component dataset instantiating said one component and associated with said one CAE application program; and engineering said product utilizing an engineering instrument, wherein said engineering instrument utilizes data contained in said component datasets instantiating said selected ones of said components.

33. An engineering services coordinating method as claimed in claim 32 wherein said instantiation-data-populating step comprises the steps of:

extracting said one CAE application record instantiating said one component from said one CAE application library; and allocating said one CAE application record to said one component dataset as said component instantiation data.

34. An engineering services coordinating method as claimed in claim 32 wherein:

said hyperdatabase contains a link table having a plurality of link records; and said method 200 additionally comprises the step of generating, within said link table, a link between said one component dataset instantiating said one component in said one program database and others of said component datasets instantiating said one component in others of said program databases.

35. An engineering services coordinating method as claimed in claim 32 wherein said library-extracting step comprises the steps of:

constructing said CAE product library configured for use with said one CAE application program, wherein said CAE product library is associated with said selected ones of said components;

identifying, in said one program database, a component dataset associated with one of said selected ones of said components;

populating a CAE application record in said CAE product library with data from said component dataset identified by said dataset-identifying step; and repeating said dataset-identifying step and said record-populating step for other ones of said selected ones of said components.

* * * * *